(12) United States Patent
Raslambekov et al.

(10) Patent No.: US 11,389,273 B1
(45) Date of Patent: Jul. 19, 2022

(54) METHODS AND SYSTEMS FOR MAKING ORTHODONTIC APPLIANCE WITH AN OBJECT THEREON

(71) Applicant: Oxilio Ltd, Larnaca (CY)

(72) Inventors: Islam Khasanovich Raslambekov, Long Island City, NY (US); Oleksandr Khmil, Long Island City, NY (US); Dmitrii Bubelnik, Long Island City, NY (US); Zelimkhan Gerikhanov, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

(21) Appl. No.: 17/392,477

(22) Filed: Aug. 3, 2021

(51) Int. Cl.
| | |
|---|---|
| G06T 15/00 | (2011.01) |
| A61C 7/08 | (2006.01) |
| A61C 7/00 | (2006.01) |
| G06T 19/20 | (2011.01) |
| G06T 19/00 | (2011.01) |
| G06T 15/50 | (2011.01) |

(52) U.S. Cl.
CPC ............... *A61C 7/08* (2013.01); *A61C 7/002* (2013.01); *G06T 15/503* (2013.01); *G06T 19/00* (2013.01); *G06T 19/20* (2013.01); *G06T 2200/08* (2013.01); *G06T 2207/30036* (2013.01); *G06T 2207/30052* (2013.01)

(58) Field of Classification Search
USPC ....................................................... 345/418
See application file for complete search history.

(56) References Cited

U.S. PATENT DOCUMENTS

| | | |
|---|---|---|
| 10,717,208 B1 | 7/2020 | Raslambekov et al. |
| 2019/0015177 A1 | 1/2019 | Elazar et al. |
| 2020/0005550 A1 | 1/2020 | Schneider et al. |
| 2020/0246119 A1 | 8/2020 | Long et al. |

FOREIGN PATENT DOCUMENTS

KR 2070256 B1 1/2020

OTHER PUBLICATIONS

Taubin G, Horn W, Lazarus F, Rossignac J. Geometry coding and VRML., Proc IEEE 1998; 86(6):1228-43.*

(Continued)

*Primary Examiner* — Phu K Nguyen
(74) *Attorney, Agent, or Firm* — BCF LLP

(57) ABSTRACT

Methods and systems for manufacturing an orthodontic appliance with an object incorporated in a surface thereof comprising: acquiring a preliminary appliance 3D digital model; acquiring an object 3D digital model; obtaining a desired coupling location of the object on the orthodontic appliance; positioning the object 3D digital model onto a surface of the preliminary appliance 3D digital model based on the obtained coupling location; causing an initial predetermined degree of penetration; merging the object 3D digital model with the preliminary appliance 3D digital model to generate an appliance 3D digital model of the orthodontic appliance with the object incorporated in the surface; and storing the appliance 3D digital model in an internal memory of the electronic device.

21 Claims, 13 Drawing Sheets

(56) References Cited

OTHER PUBLICATIONS

Barone S, Paoli A, Razionale AV, Savignano R. Computational design and engineering of polymeric orthodontic aligners. International journal for numerical methods in biomedical engineering. Aug. 2017;33(8):e2839.*

Barone S, Paoli A, Razionale AV, Savignano R. Design of customised orthodontic devices by digital imaging and CAD/FEM modelling. In International Conference on Bioimaging Feb. 21, 2016 (vol. 3, pp. 44-52). SciTePress.*

Machine translation of KR2070256B1 retrieved on Apr. 27, 2021 from Derwent Innovation.

* cited by examiner

METHODS AND SYSTEMS FOR MAKING ORTHODONTIC APPLIANCE WITH AN OBJECT THEREON

The present technology relates to methods and systems for making an orthodontic appliance, in general; and more specifically, making an orthodontic appliance having an object thereon.

BACKGROUND

In orthodontics, treatments for achieving alignment of malposed teeth in a subject include applying dental appliances, such as orthodontic aligners, to the subject's teeth. Orthodontic aligners are typically worn over the teeth of an arch form in order to exert a force to the teeth to move the teeth to a desired position, such as to align malocclusions. Generally, physical parameters of the aligner, such as its inner surface shape, type of material, and thickness, among other factors, define the respective forces exerted to the teeth and the effective correction that may be attained. The outer surface shape of the aligner is also configured to avoid irritation to the subject's gums and to not adversely affect the subject's bite. Such physical parameters of each aligner are tailored for each subject. As part of an orthodontic treatment plan for moving the teeth to the desired position, the subject may need to sequentially wear different aligners in sequential treatment steps, each aligner having different physical parameters.

Typically, for each treatment step, the orthodontic aligner is custom-designed based on a desired position of the teeth for the treatment step and a 3D representation of the teeth.

The aligner can be made by a thermoforming process, in which a preform is shaped using a mold to produce an unfinished aligner. The unfinished aligner is further processed, such as by trimming excess material along a cut line to produce an edge of the aligner. Such an edge may be designed to correspond to a gum-tooth boundary of the subject for comfort.

Each aligner may require certain markings thereon, on its inner or outer surfaces, to indicate or to interact with a button or a compliance indicator on the teeth, indicate an identity of the subject, indicate an identification of the treatment step, indicate a serial number of the aligner, advertising, and so on. The markings may be indents, numerical characters, letters, symbols, patterns or combinations of the same.

Conventionally, such markings are formed by laser methods which create embossed markings by local melting of the aligner material. The markings are typically formed on the aligner after the manufacturing process through which the desired configuration of the inner and outer surfaces have been attained to define the respective forces exerted to the subject's teeth. The laser-produced markings may thus affect the desired treatment to the teeth. For example, areas around the markings on the aligner may be bulging or otherwise deformed due to the local melting induced by the laser marking method. Such deformations may also be caused through lack of ease of control of the laser focal length.

When the local deformation is on the inner surface of the aligner, this can adversely affect the stresses applied to the subject's teeth either directly or through incorrect positioning of buttons and compliance indicators. When the local deformation is on the outer surface of the aligner, this may cause irritation to the subject's gums, incorrect bite and lack of compliance to the treatment by the subject. When the local deformation is on an aligner mold used to make the aligner, the resultant aligner may not have the desired configuration resulting in either discomfort to the user or an ineffective orthodontic treatment.

SUMMARY

It is an object of the present technology to ameliorate at least some of the inconveniences present in the prior art.

The developers of the present technology have devised a method for manufacturing an orthodontic appliance having an object on a surface thereon, which may be an embossment or a protrusion, and which does not have local deformations thereabout.

From a first aspect, there is provided a method of manufacturing an orthodontic appliance with an object incorporated in a surface thereof, the method executable by a processor of an electronic device, the method comprising: acquiring, by the processor, a preliminary appliance 3D digital model, the preliminary appliance 3D digital model including a representation of the surface of the orthodontic appliance to which the object will be incorporated; acquiring, by the processor, an object 3D digital model representative of the object to be incorporated in the surface of the orthodontic appliance, the object 3D digital model comprising a plurality of vertices; obtaining, by the processor, a desired coupling location of the object on the surface of the orthodontic appliance; positioning, by the processor, the object 3D digital model onto a surface of the preliminary appliance 3D digital model based on the obtained coupling location, the positioning comprising at least one vertex representing at least a portion of a base of the object being positioned on the surface of the preliminary appliance 3D digital model according to the coupling location; causing, by the processor, an initial predetermined degree of penetration of the at least one vertex into the surface of the preliminary appliance 3D digital model at the coupling location; merging, by the processor, the object 3D digital model with the preliminary appliance 3D digital model to generate an appliance 3D digital model of the orthodontic appliance with the object incorporated in the surface, the merging including: iteratively modifying, if each vertex of the plurality of vertices of the base of the object 3D digital model are not within the surface of the preliminary appliance 3D digital model, the initial predetermined degree of penetration of the object 3D digital model into the preliminary appliance 3D digital model based on a predetermined step until: each vertex of the plurality of vertices of the base of the object 3D digital model is within the surface of the preliminary appliance 3D digital model; and storing, by the processor, the appliance 3D digital model in an internal memory of the electronic device.

In certain embodiments, the iteratively modifying is performed until a target predetermined degree of penetration of the object is attained.

In certain embodiments, the method further comprises, prior to the storing, extruding the object 3D digital model into the surface of the preliminary object 3D digital model whilst retaining the base of the object 3D digital object at the target predetermined degree of penetration.

In certain embodiments, the method further comprises determining a depth of the object 3D digital model under the surface of the preliminary appliance 3D digital model, and if the determined depth is different to a target depth, modulating the depth to attain the target depth.

In certain embodiments, the method further comprises, determining a depth of the object 3D digital model under the surface of the preliminary appliance 3D digital model, and if the determined depth is above or below a threshold depth, incrementally modulating the depth.

In certain embodiments, the method further comprises determining a height of the object 3D digital model above the surface of the preliminary appliance 3D digital model, and if the determined height is different to a target height, modulating the height to attain the target height.

In certain embodiments, the method further comprises determining a height of the object 3D digital model above the surface of the preliminary appliance 3D digital model, and if the determined height is above or below a threshold depth, incrementally modulating the height.

In certain embodiments, wherein the object is a marker indicative of one or both of: (i) a treatment step associated with the orthodontic appliance, and (ii) an identity of a subject associated with the orthodontic appliance.

In certain embodiments, wherein the object is an embossment in a surface of the orthodontic appliance.

In certain embodiments, wherein the orthodontic appliance is an orthodontic aligner or an aligner mold.

In certain embodiments, wherein the orthodontic appliance is an aligner and the object is an indent on an inner surface of the aligner, the indent configured to receive an attachment coupled to a tooth of the subject when the aligner is worn by the subject over the tooth.

In certain embodiments, wherein the object is a protrusion from the surface of the orthodontic appliance.

In certain embodiments, wherein the orthodontic appliance is an orthodontic aligner or an aligner mold.

In certain embodiments, wherein the obtaining the coupling location comprises determining the coupling location, the determining the coupling location comprising: obtaining at least one excluded area for the object on the orthodontic appliance; and determining the coupling location as being on a portion of the orthodontic appliance which is not within the at least one excluded area.

In certain embodiments, wherein the object 3D digital model is movable along the surface of the preliminary appliance 3D digital model within a coupling area which includes the coupling location, and the method further comprising restricting any movement of the object 3D digital model beyond the coupling area.

In certain embodiments, wherein the coupling area is defined on a portion of the preliminary appliance 3D digital model corresponding to a buccal surface of a given one of subject's teeth when the orthodontic appliance is worn over the teeth.

In certain embodiments, the method further comprises causing, by the processor, the manufacturing of the orthodontic appliance including the object thereon based on the determined appliance 3D digital model.

In certain embodiments, the manufacturing comprises a thermoforming process.

In certain embodiments, the method further comprises determining an appliance mold 3D digital model based on the determined appliance 3D digital model.

From another aspect, there is provided a system of manufacturing an orthodontic appliance with an object incorporated in a surface thereof, the system comprising an electronic device having a processor, the processor configured to execute a method comprising: acquiring a preliminary appliance 3D digital model, the preliminary appliance 3D digital model including a representation of the surface of the orthodontic appliance to which the object will be incorporated; acquiring an object 3D digital model representative of the object to be incorporated in the surface of the orthodontic appliance, the object 3D digital model comprising a plurality of vertices; obtaining a desired coupling location of the object on the surface of the orthodontic appliance; positioning the object 3D digital model onto a surface of the preliminary appliance 3D digital model based on the obtained coupling location, the positioning comprising at least one vertex representing at least a portion of a base of the object being positioned on the surface of the preliminary appliance 3D digital model according to the coupling location; causing an initial predetermined degree of penetration of the at least one vertex into the surface of the preliminary appliance 3D digital model at the coupling location; merging the object 3D digital model with the preliminary appliance 3D digital model to generate an appliance 3D digital model of the orthodontic appliance with the object incorporated in the surface, the merging including: iteratively modifying, if each vertex of the plurality of vertices of the base of the object 3D digital model are not within the surface of the preliminary appliance 3D digital model, the initial predetermined degree of penetration of the object 3D digital model into the preliminary appliance 3D digital model based on a predetermined step until each vertex of the plurality of vertices of the base of the object 3D digital model is within the surface of the preliminary appliance 3D digital model; and storing the appliance 3D digital model in an internal memory of the electronic device.

In certain embodiments, the method further comprises a manufacturing system for manufacturing the appliance from the determined appliance 3D digital model.

In certain embodiments, the manufacturing system comprises a thermoforming system for making an aligner from an aligner mold.

In certain embodiments, the determined appliance 3D digital model is of an aligner mold, and the object is an indent or a protrusion from the surface of the aligner mold.

In certain embodiments, the determined appliance 3D digital model is of an aligner, and the object is an indent or a protrusion from the surface of the aligner.

In certain embodiments, the processor is configured to determine an appliance mold 3D digital model based on the determined appliance 3D digital model.

Certain non-limiting embodiments of the present technology minimize, reduce or avoid some of the problems noted in association with the prior art. For example, by implementing certain embodiments of the present technology, one or more objects may be incorporated in a surface of an orthodontic appliance without any local deformation, or with reduced extent of local deformation, at a location of the incorporation of the object on the orthodontic appliance or on the object. By local deformation is meant unintended protrusions or undulations in the surface of the orthodontic appliance which may cause irritation to the soft tissues of the subject wearing the orthodontic appliance. Such irritation can affect patient compliance to the orthodontic treatment being administered by the orthodontic appliance thereby affecting the orthodontic treatment itself. Such local deformation may also affect a correct positioning of the aligner over the teeth of the subject which in turn can affect the effectivity of the orthodontic treatment to be administered by the orthodontic appliance.

Local deformations can also more directly affect the orthodontic treatment, such as when the object is a recess formed in an inner surface of an aligner and which is configured to receive and line up positionally with an attachment on the subject's tooth when the aligner is worn over the teeth. In such embodiments, local deformations either in the recess or on the surface of the aligner near the recess can affect the function of the recess in terms of lining up with the attachment in use and/or receiving the attachment in an effective manner.

Furthermore, embodiments of the present technology do not require laser marking methods of the prior art, thereby avoiding the need for laser equipment and complex focal length setting methodologies. Embodiments of the present technology are therefore less resource intensive than prior art methods. Once a 3D digital model of the orthodontic appliance with the object incorporated thereon is generated according to embodiments of the present technology, the orthodontic appliance can be manufactured directly therefrom such as by additive manufacturing or indirectly using a mold. The 3D digital model of the orthodontic appliance with the object incorporated thereon is free from local deformations as the object has been effectively merged with the orthodontic appliance.

In the context of the present specification, unless expressly provided otherwise, the term "orthodontic treatment" is broadly referred to as any type of medical intervention aimed at correcting malocclusions associated with the teeth of the patient or moving the patient's teeth for any reason, including surgical and non-surgical manipulations, such as, but not limited to, using one or more of aligners, brackets, multi-strand wires, strips, retainers, and plates. Further, the orthodontic treatment, as referred to herein, may be determined automatically by a software, based on image data and other inputs associated with the subject, or semi-automatically with input from a practitioner in the field of dentistry (such as an orthodontist, a maxillofacial surgeon, for example).

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Certain aspects and embodiments of the present technology are related to orthodontic appliances having an object formed on a surface thereon. Present aspects and embodiments comprise one or more of: (1) methods and systems for manufacturing the orthodontic appliance having the object thereon, (2) methods and systems for manufacturing a mold for the orthodontic appliance having the object thereon, (3) methods and systems for generating a 3D digital model of the orthodontic appliance having the object thereon, and/or (4) methods and systems for generating a 3D digital model of a mold of the orthodontic appliance having the object thereon. The orthodontic appliance may be part of an orthodontic treatment for a subject (also referred to herein as a "patient"). The orthodontic treatment may include one or more treatment steps. The object may be an indent configured to interact with one or more attachments on the subject's teeth, or a marking for identification or labeling purposes.

Certain aspects and embodiments of the present technology will now be described below with reference to an aligner 10 as an orthodontic appliance for providing an orthodontic treatment to teeth of the subject. In other embodiments, the orthodontic appliance may comprise a mold for thermoforming an aligner. It will be appreciated that embodiments of the present technology can be applied to any other type of orthodontic appliance.

Orthodontic Appliances

Figure 1:
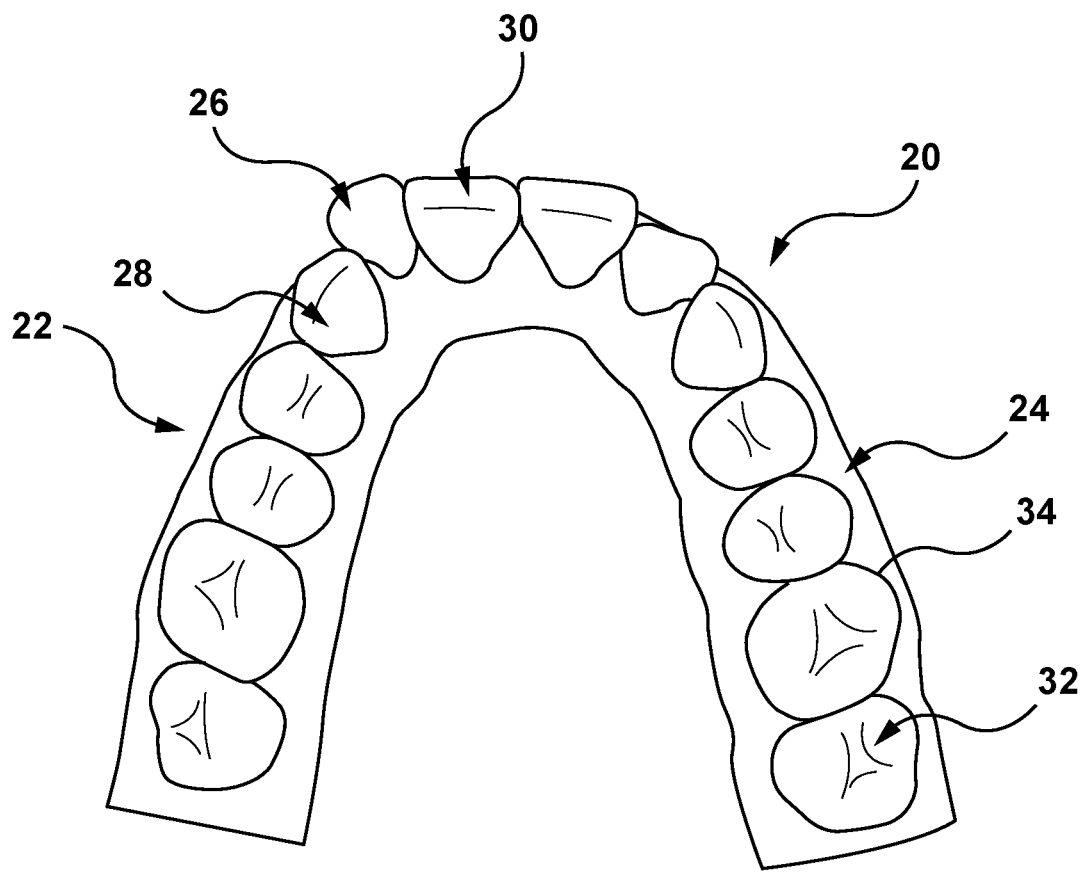
FIG. 1 depicts a bottom plan view of an upper arch form of a subject, in accordance with non-limiting embodiments of the present technology.

Referring initially to FIG. 1, there is depicted a bottom view of an upper arch form 20 of the patient, to which certain aspects and non-limiting embodiments of the present technology may be applied.

The upper arch form 20 includes upper teeth 22 and upper gingiva 24. The upper teeth 22 include a first tooth 26 which is misaligned, a second tooth 28 which is adjacent to the first tooth 26 and a third tooth 30 which is adjacent to the first tooth 26. As can be seen in FIG. 1, the first tooth 26 is positioned outwardly relative to its neighboring teeth: the second tooth 28 and the third tooth 30. Thus, for the purposes of describing embodiments of the present technology, the orthodontic treatment to be determined for the patient is that of correcting the misalignment of the first tooth 26, i.e. moving the first tooth 26 from a start position shown in FIG. 1 to a target position in which the first tooth 26 is aligned with its neighboring teeth.

In accordance with certain non-limiting embodiments of the present technology, the orthodontic treatment may comprise applying one or more orthodontic appliances in the one or more treatment segments to the upper arch form 20. Generally speaking, the orthodontic appliance may be configured to exert a force onto the first tooth 26 causing it to move towards the target position, that is, in the depicted embodiments of FIG. 1, inwardly between the second tooth 28 and the third tooth 30 to align with the second tooth 28 and the third tooth 30. The first tooth 26 may be caused to move to the target position in one or more treatment segments. In various non-limiting embodiments of the present technology, the orthodontic appliance may comprise any suitable type, shape, size and configuration, such as those including, without limitation, aligners, brackets, multistrand wires, strips, retainers, and plates.

Figure 2A:
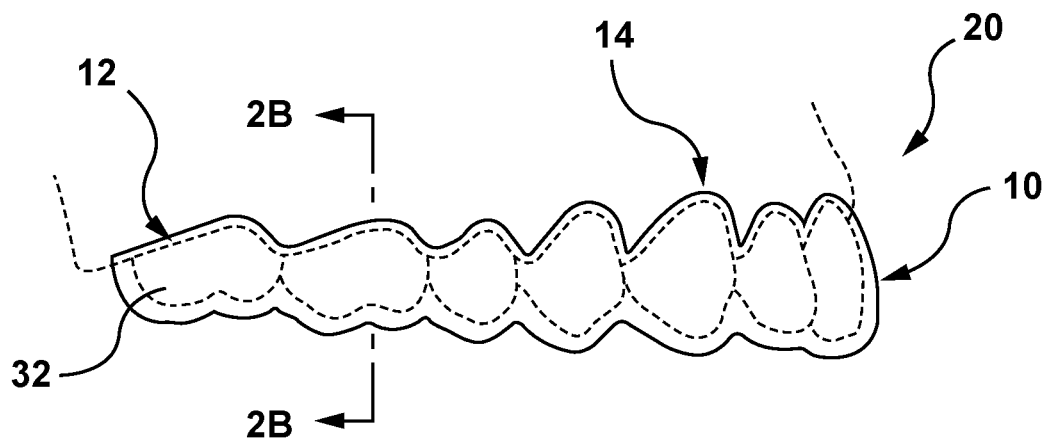
FIG. 2A depicts a side elevation view of the upper arch form of FIG. 1 and including an aligner, in accordance with non-limiting embodiments of the present technology.
Figure 2B:
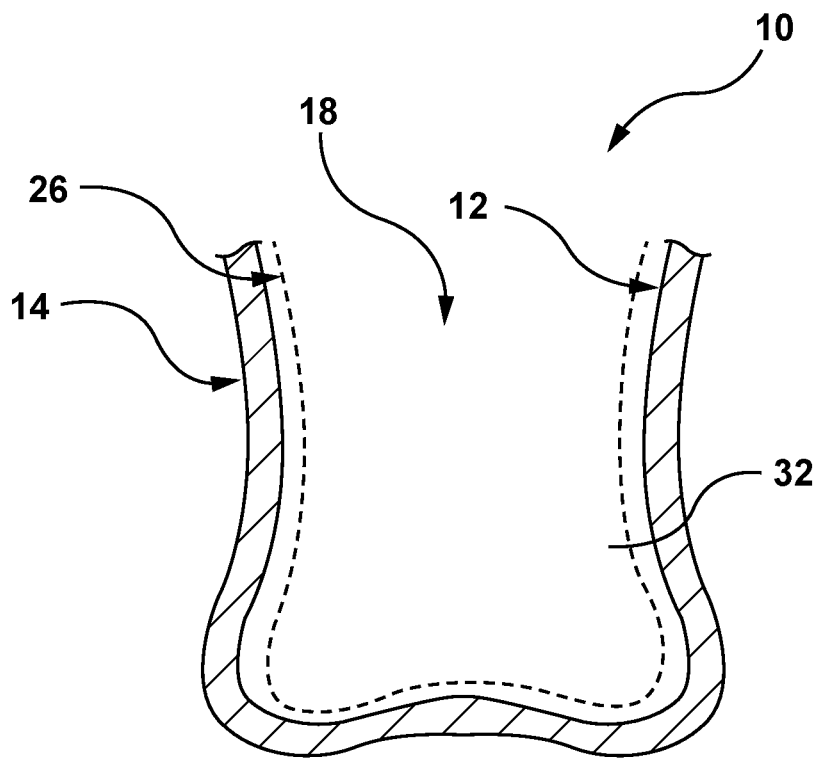
FIG. 2B depicts a cross-sectional view through line 2B-2B of FIG. 2A.

With reference to FIGS. 2A and 2B, there is depicted the aligner 10 applied to at least some of the upper teeth 22, in accordance with certain non-limiting embodiments of the present technology. The aligner 10 comprises an inner surface 12 and an outer surface 14. The inner surface 12 defines a channel 18, which is configured, in some non-limiting embodiments of the present technology, for receiving crown portions 32 of at least some of the upper teeth 22 including the first tooth 26, the second tooth 28 and the third tooth 30. However, in other non-limiting embodiments of the present technology, the channel 18 of the aligner 10 may be configured to receive crown portions 32 of all of the upper teeth 22. At least one edge of the channel 18 is shaped for following a gum line along the upper gingiva 24.

In accordance with the non-limiting embodiments of the present technology, a size, a form factor (such as a U-shape or a V-shape, for example), and a configuration of the aligner 10, including a material and a thickness thereof, depend generally on a particular malocclusion disorder of the patient (such as the misalignment of the first tooth 26 within the upper teeth 22) or the determined orthodontic treatment for the malocclusion. As an example, in some non-limiting embodiments of the present technology, the thickness of the aligner 10 may be about 0.7 mm. In other non-limiting embodiments of the present technology, the thickness is selected from 0.7 mm, 0.75 mm, 0.8 mm, 0.85 mm, 0.9 mm, 0.95 mm, and 1.0 mm. In yet other non-limiting embodiments of the present technology, the aligner 10 may have regions of variable thickness, such as interdental regions or ocular regions, as an example.

According to certain non-limiting embodiments of the present technology, the aligner 10 may be made of a polymer, such as a thermoplastic material. In other non-limiting embodiments of the present technology, the aligner 10 may be made of poly-vinyl chloride (PVC). In yet other non-limiting embodiments of the present technology, the aligner 10 may be made of polyethylene terephthalate glycol (PETG). Other suitable materials can also be used to form the aligner 10.

It is to be appreciated that, in accordance with certain non-limiting embodiments of the present technology, the aligner 10 may be used for treating different types of teeth misalignment or malocclusion, including but not limited to one or more of: closing gaps ("space closure"), creating/widening gaps, tooth rotation, tooth intrusion/extrusion, and tooth translation, to name a few. It should further be noted that in certain non-limiting embodiments of the present technology, applying the aligner 10 to the upper teeth 22 may further include applying specific attachments (also known as "fixing blocks") thereto.

The aligner 10 is configured in such a way that its inner surface 12 is configured to impose a desired force on one or more of the upper teeth 22, when the aligner 10 is worn over the teeth, to obtain the target position of the one or more upper teeth 22 at a given stage of the orthodontic treatment.

Needless to say, that although in the depicted embodiments of FIGS. 2A and 2B the aligner 10 is configured to be applied to the upper teeth 22, in other non-limiting embodiments of the present technology, the aligner 10 may be configured to be applied to teeth of a lower arch form of the patient.

Figure 3A:
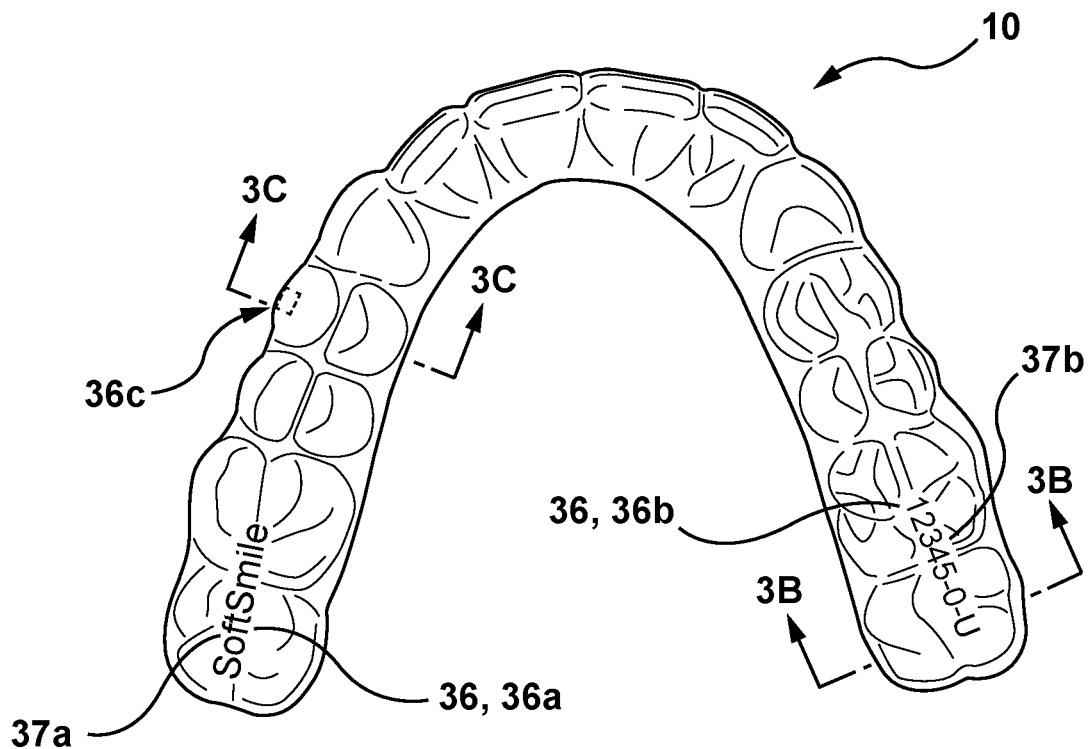
FIG. 3A depicts a bottom plan view of an aligner including objects thereon, in accordance with non-limiting embodiments of the present technology.
Figure 3B:
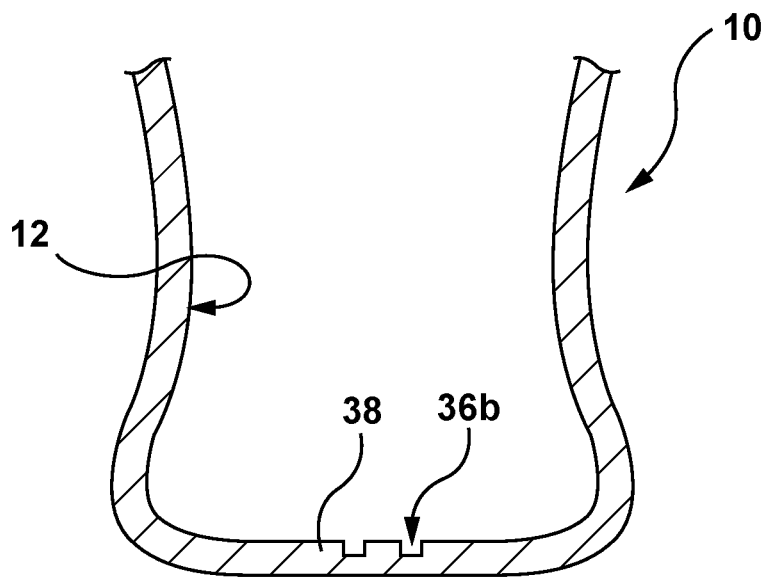
FIG. 3B is a cross-sectional view through line 3B-3B of FIG. 3A.
Figure 3C:
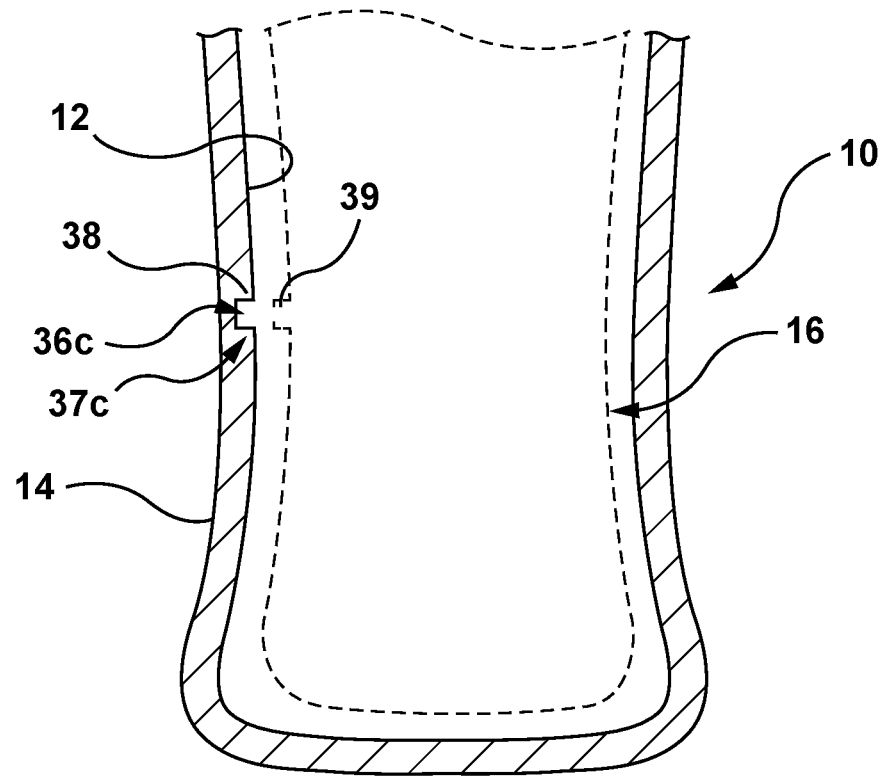
FIG. 3C is a cross-sectional view through line 3C-3C of FIG. 3A.

Referring to FIGS. 3A, 3B and 3C, according to certain embodiments of the present technology, the aligner 10 includes one or more objects 36 formed on a surface thereof. As illustrated and described herein, in certain embodiments, the object 36 is a marking for depicting various information such as one or more of: the treatment stage for which the aligner 10 is intended, an identity of the patient for whom the aligner 10 is intended, an identity of the clinician or his/her clinic, a date, etc. The object 36 may comprise a number, a letter, an alphanumerical string, one or more symbols, a pattern, a machine-readable code, and the like. The object 36 has a three-dimensional configuration and may be configured as one or both of an embossing on a surface of the aligner 10 or a protrusion on the surface of the aligner 10.

Example objects 36, are illustrated in FIGS. 3A and 3B and which are alphanumerical strings embossed on the inner surface 12 of the aligner 10 for identification purposes. A first object 36a comprises a string of letters which are positioned at a first coupling point 37a. A second object 36b comprises a string of letters and numbers separated by dashes and are positioned at a second coupling point 37b. The first and second objects 36a, 36b have a contrasting color compared to the aligner 10 so that they are readily visible. However, in other embodiments, the first and second objects 36a, 36b may vary in color or be transparent or translucent. In the example of FIGS. 3A and 3B, the first and second coupling points 37a, 37b are shown as being at a portion of the inner surface 12 which would face an occlusal surface of the upper teeth 22 of the patient in use. In other embodiments, the first and second coupling points 37a, 37b may be at any other position on the aligner 10.

As best seen in FIG. 3B, the object 36 can be considered as a three-dimensional embossment formed into the inner surface 12 of the aligner 10. In other embodiments (not shown), the object 36 is a three-dimensional embossment formed into the outer surface 14 of the aligner 10. Advantageously, in certain embodiments in which the object 36 is an embossment, it does not touch or otherwise interfere with the upper teeth 22 in use.

In yet other embodiments (not shown), the object 36 is a three-dimensional protrusion extending from one or both of the inner surface 12 or the outer surface 14 of the aligner 10. In further embodiments, the object 36 may include both embossed and protruded portions.

In other embodiments (FIG. 3C), the object 36 is an indent 36c ("third object") at a given coupling location 37c configured to receive an attachment 39 on the tooth.

Figure 4:
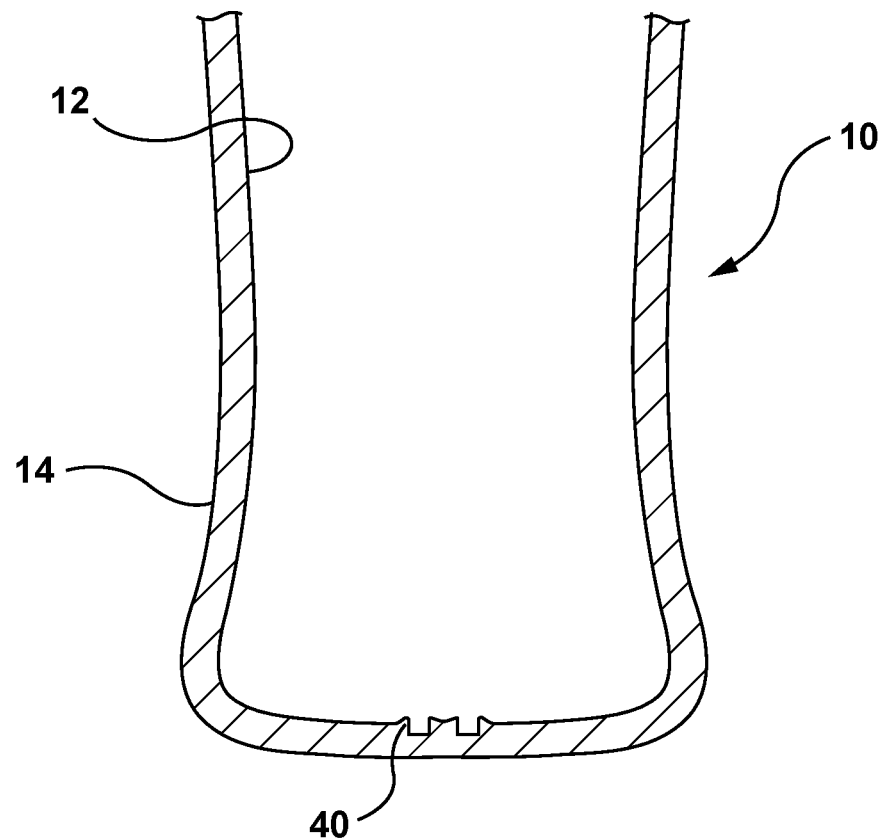
FIG. 4 depicts a cross-sectional view through an aligner of the prior art including an object formed therein.

Furthermore, according to certain embodiments of the present technology, the inner surface 12 of the aligner 10, at edges 38 of the object 36 (e.g. 36a, 36b and 36c), are substantially linear. Bulges and other manufacturing artifacts are absent. This also applies to other embodiments in which the object 36 is formed on the outer surface 14 of the aligner 10. In contrast, such local deformations 40 and manufacturing artifacts are seen in certain conventionally made aligners with markings which are typically formed by laser techniques, an example of which is shown in FIG. 4. These bulges and manufacturing defects may affect the proper positioning of the aligner 10 on the teeth. They may also cause collisions between attachments on the teeth and the aligner 10, if any.

Furthermore, prior art methods of marking aligners with lasers is a complex and resource intensive process requiring specialized laser equipment and a requirement to set an exact focal length of the laser. Deviations from a desired focal length can cause aligner material fusion thereby creating one or more defects on the inner surface of the aligner.

Figure 5:
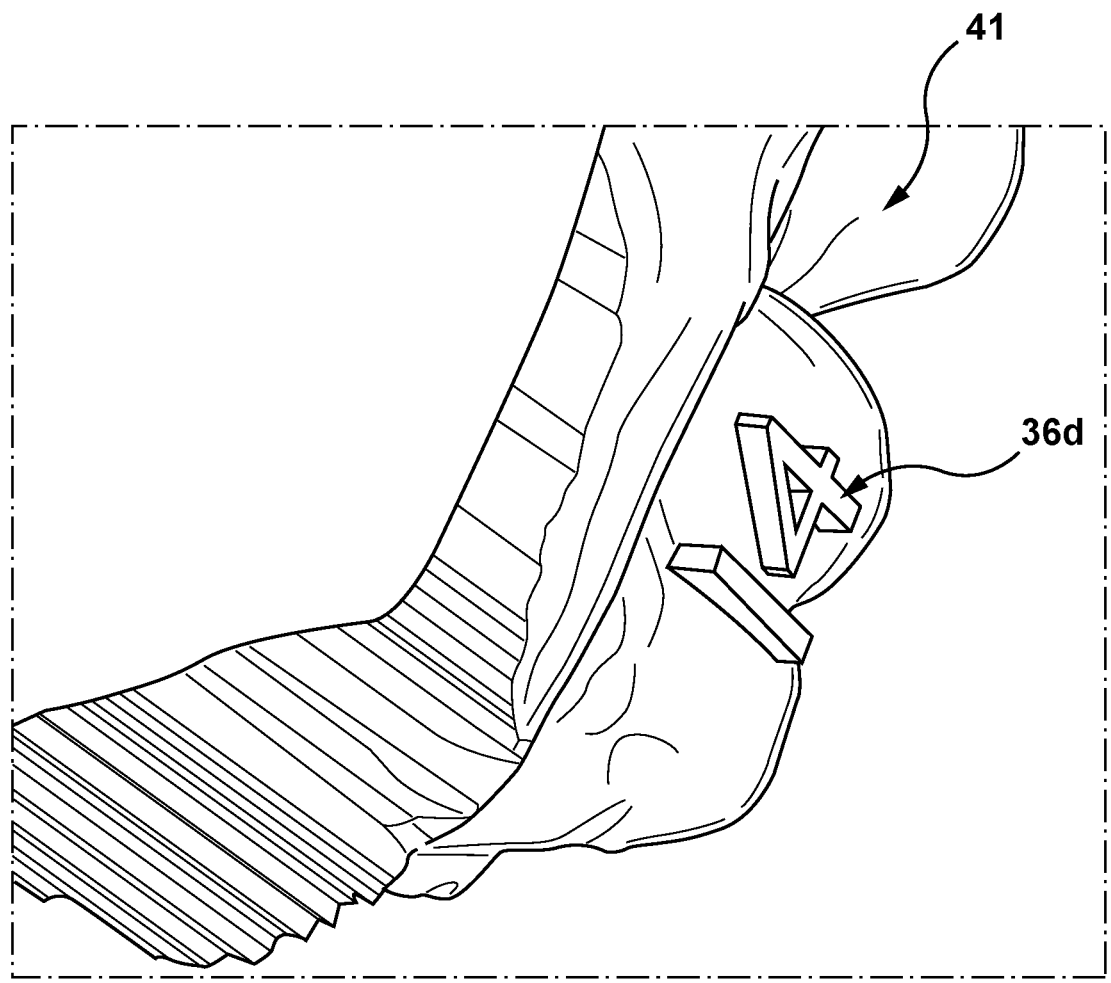
FIG. 5 depicts a perspective view of an aligner mold including an object thereon, in accordance with non-limiting embodiments of the present technology.

In yet other embodiments, the object 36 is a protrusion extending from a surface of an aligner mold used to make the aligner 10. A 3D digital model 41 of an aligner mold with the object 36 as a protrusion 36d is depicted in FIG. 5. As depicted in FIG. 5, the protrusion 36d ("fourth object") is of the number "14" extending from the surface of the aligner mold which would create an embossment of the number "14" in the resultant aligner made from the aligner mold.

In yet other embodiments, the object 36 is a protrusion extending from a surface of the aligner 10 which is configured to engage with the teeth of the object or with an attachment attached to the teeth of the subject.

In certain aspects and embodiments of the present technology, there are provided methods and systems for generating a 3D digital model of the aligner 10 including the object 36 which can be used to directly manufacture the aligner 10, such as by additive manufacturing, or indirectly such as through thermoforming using a mold, for example.

In certain other aspects and embodiments of the present technology, there are provided methods and systems for generating a 3D digital model of the aligner mold including the object 36 which can be used to manufacture the aligner 10, such as by thermoforming, for example.

System

Figure 6:
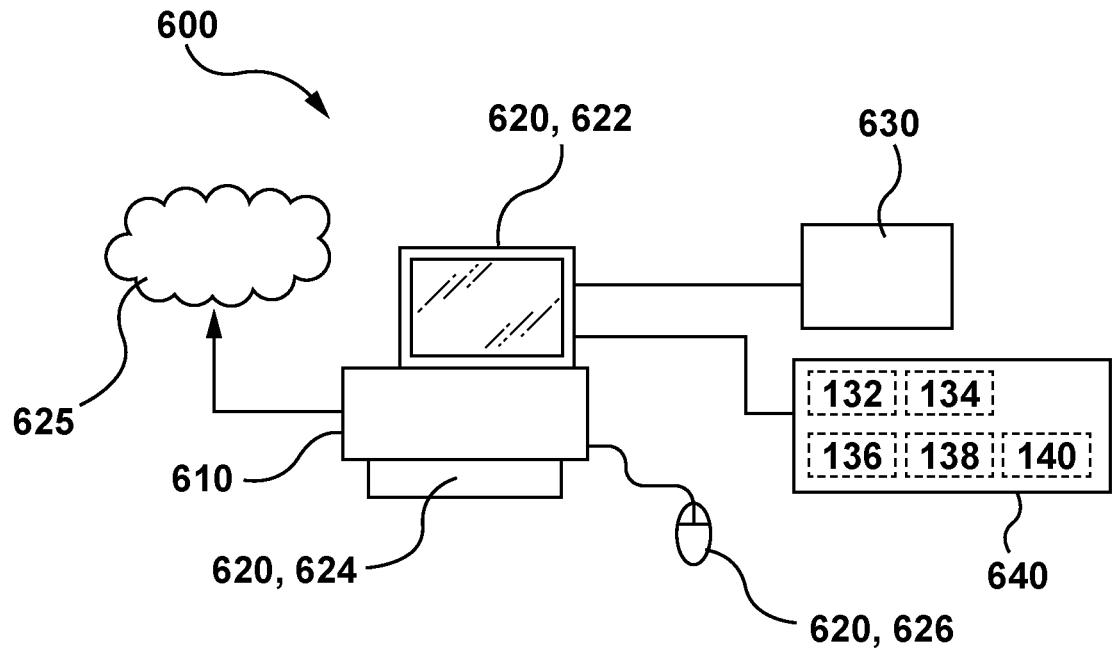
FIG. 6 depicts a schematic diagram of a system for manufacturing an orthodontic appliance including an object thereon, in accordance with certain non-limiting embodiments of the present technology.

Referring to FIG. 6, there is depicted a schematic diagram of a system 600 suitable for manufacturing the aligner 10 or the aligner mold including the object 36 and/or for generating a 3D digital model of the aligner 10 or the aligner mold which can be used to manufacture the aligner 10, in accordance with certain non-limiting embodiments of the present technology.

It is to be expressly understood that the system 600 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 600 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 600 may provide in certain instances simple implementations of the present technology, and that where such is the case they have been presented in this manner as an aid to understanding. As persons skilled in the art would further understand, various implementations of the present technology may be of a greater complexity.

In certain non-limiting embodiments of the present technology, the system 600 of FIG. 6 comprises a computer system 610. The computer system 610 may be configured, by pre-stored program instructions, to perform, based on image data associated with the subject, methods described herein for modeling mandibular motion for the subject, according to certain non-limiting embodiments of the present technology, as will be described further below.

To that end, in some non-limiting embodiments of the present technology, the computer system 610 is configured to receive image data pertaining to the subject or to a given stage of the orthodontic treatment. According to some non-limiting embodiments of the present technology, the computer system 610 may receive the image data via local input/output interface (such as USB, as an example, not separately depicted). In other non-limiting embodiments of the present technology, the computer system 610 may be configured to receive the image data over a communication network 625, to which the computer system 610 is communicatively coupled.

In some non-limiting embodiments of the present technology, the communication network 625 is the Internet and/or an Intranet. Multiple embodiments of the communication network may be envisioned and will become apparent to the person skilled in the art of the present technology. Further, how a communication link between the computer system 610 and the communication network 625 is implemented will depend, inter alia, on how the computer system 610 is implemented, and may include, but is not limited to, a wire-based communication link and a wireless communication link (such as a Wi-Fi communication network link, a 3G/4G communication network link, and the like).

It should be noted that the computer system 610 can be configured for receiving the image data from a vast range of devices. Some of these devices can be used for capturing and/or processing data pertaining to maxillofacial and/or cranial anatomy of the subject. In certain embodiments, the image data received from such devices is indicative of properties of anatomical structures of the subject, including but not limited: teeth, intraoral mucosa, maxilla, mandible, temporomandibular joint, and nerve pathways, among other structures. In some non-limiting embodiments of the present technology, at least some of the image data is indicative of properties of external portions of the anatomical structures, for example dimensions of a gingival sulcus, and dimensions of an external portion of a tooth (e.g., a crown of the tooth) extending outwardly of the gingival sulcus. In some embodiments, the image data is indicative of properties of internal portions of the anatomical structures, for example volumetric properties of bone surrounding an internal portion of the tooth (e.g., a root of the tooth) extending inwardly of the gingival sulcus. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics. In some embodiments, the image data includes datasets generally intended for the practice of periodontics.

In non-limiting embodiments of the present technology, the computer system 610 is configured to receive the image data associated with the subject directly from an imaging device 630 (shown schematically in FIG. 6) communicatively coupled thereto. Broadly speaking the imaging device 630 may be configured, for example, by a processor 750 depicted in FIG. 7, to capture and/or process the image data of the upper teeth 22 and the upper gingiva 24 of the subject. In certain non-limiting embodiments of the present technology, the image data may include, for example, one or more of: (1) images of external surfaces of respective crown portions, such as the crown portions 32 of the upper teeth 22, (2) images of an external surface of periodontium including those of upper or lower gingiva (such as the upper gingiva 24), the alveolar maxillary bone (not depicted), and images of superficial blood vessels and nerve pathways associated with the upper teeth 22; and (3) images of an oral region. By doing so, the imaging device 630 may be configured, for example, to capture image data of the upper arch form 20 of the subject. In another example, the imaging device 630 may also be configured to capture and/or process image data of the upper arch form 20 associated with the subject without departing from the scope of the present technology. It should be noted that the image data may include two-dimensional (2D) data and/or three-dimensional data (3D). In certain embodiments, the image data includes at least one dataset derived from one or more of the following imaging modalities: computed tomography (CT), radiography, magnetic resonance imaging, ultrasound imaging, nuclear imaging and optical imaging. Any medical imaging modality is included within the scope of the present technology. In certain embodiments, the image data includes 2D data, from which 3D data may be derived, and vice versa.

In certain embodiments, the imaging device 630 includes an image capture sensor for capturing imaging data and a processor arranged to receive and transmit the imaging data. The imaging device 630 may be further configured to process the image data to generate digital, 3D models based on the image data, for example. Alternatively, it is contemplated that the processing of the image data may be performed by the computer system 610. The resulting image data received by the computer system 610 is typically structured as a binary file or an ASCII file, may be discretized in various ways (e.g., point clouds, polygonal meshes, pixels, voxels, implicitly defined geometric shapes), and may be formatted in a vast range of file formats (e.g., STL (standard tessellation language), OBJ (object file format), PLY (Polygon file format), DICOM (digital imaging and communications in medicine), and various software-specific, proprietary formats). Any image data file format is included within the scope of the present technology.

Alternatively, as contemplated in other embodiments, the imaging device 630 may instead be a desktop scanner (not shown) for indirect digitization of intraoral anatomy via a replica (i.e., a dental model). In some such embodiments, the replica is obtainable via a dental impression (i.e., a negative mold) made of a material (such as polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica. The replica may then be retrieved from the dental impression and digitized by the desktop scanner to generate the digital surface model. Alternatively, in other embodiments, the digital surface model may be generated via digitizing the dental impression.

In some non-limiting embodiments of the present technology, the imaging device 630 may comprise an intra-oral scanner enabling to capture direct optical impressions of the upper arch form 20 of the subject. In a specific non-limiting example, the intraoral scanner can be of one of the types available from MEDIT, corp. of 23 Goryeodae-ro 22-gil, Seongbuk-gu, Seoul, South Korea. It should be expressly understood that the intraoral scanner can be implemented in any other suitable equipment.

In other non-limiting embodiments of the present technology, the imaging device 630 may comprise a desktop scanner enabling to digitize a mold representing the arch forms of the subject. In this regard, the mold may have been obtained via dental impression using a material (such as a polymer, e.g. polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica.

In a specific non-limiting example, the imaging device 630 can be of one of the types available from Dental Wings, Inc. of 2251, ave Letourneux, Montreal (QC), Canada, H1V 2N9. It should be expressly understood that the desktop scanner can be implemented in any other suitable equipment.

In order to image mandibular condyles, in non-limiting embodiments of the present technology, the imaging device 630 may comprise a cone beam computed tomography (CBCT) scanner. Generally speaking, the CBCT scanner comprises software and hardware allowing for capturing data using a cone-shaped X-ray beam by rotating around the subject's head. This data may be used to reconstruct 3D representations of the following regions of the subject's anatomy: dental (teeth and gum, for example); oral and maxillofacial region (mouth, jaws, and neck); and ears, nose, and throat ("ENT"). In some other non-limiting embodiments of the present technology, the imaging device 630 could additionally or alternatively include a magnetic resonance imaging (MRI) scanner for imaging the mandibular condyles.

In a specific non-limiting example, the CBCT scanner can be one of the types available from 3Shape, Private Limited Company of Holmens Kanal 7, 1060 Copenhagen, Denmark. It should be expressly understood that the CBCT scanner can be implemented in any other suitable equipment.

Further, it is contemplated that the computer system 610 may be configured for processing of the received image data. The resulting image data of the upper arch form 20 received by the computer system 610 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology. For implementing functions described above, the computer system 610 may further comprise a corresponding computing environment.

Figure 7:
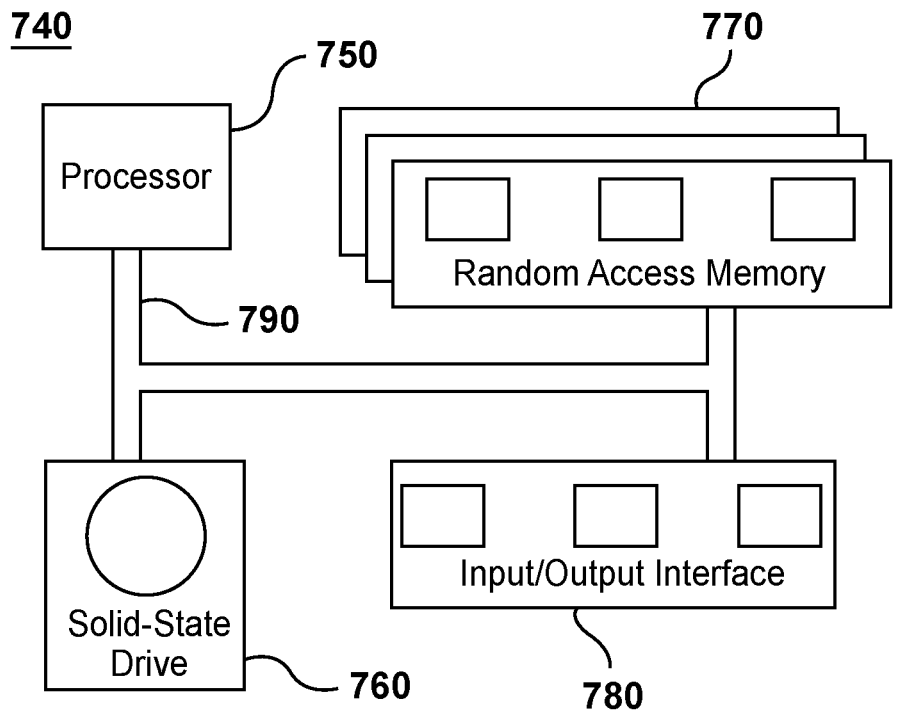
FIG. 7 depicts a schematic diagram of a computing environment of the system of FIG. 6, in accordance with certain embodiments of the present technology.

With reference to FIG. 7, there is depicted a schematic diagram of an electronic device 740, also referred to as a computing environment 740, suitable for use with some implementations of the present technology. The computing environment 740 includes various hardware components including one or more single or multi-core processors collectively represented by the processor 750, a solid-state drive 760, a random access memory 770 and an input/output interface 780. Communication between the various components of the computing environment 740 may be enabled by one or more internal and/or external buses 790 (e.g. a PCI bus, universal serial bus, IEEE 1394 "Firewire" bus, SCSI bus, Serial-ATA bus, ARINC bus, etc.), to which the various hardware components are electronically coupled.

The input/output interface 780 allows enabling networking capabilities such as wire or wireless access. As an example, the input/output interface 780 comprises a networking interface such as, but not limited to, a network port, a network socket, a network interface controller and the like. Multiple examples of how the networking interface may be implemented will become apparent to the person skilled in the art of the present technology. For example, but without being limiting, the input/output interface 780 may implement specific physical layer and data link layer standard such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 760 stores program instructions suitable for being loaded into the random access memory 770 and executed by the processor 750, according to certain aspects and embodiments of the present technology. For example, the program instructions may be part of a library or an application.

In some non-limiting embodiments of the present technology, the computing environment 740 is implemented in a generic computer system, which is a conventional computer (i.e. an "off the shelf" generic computer system). The generic computer system may be a desktop computer/personal computer but may also be any other type of electronic device such as, but not limited to, a laptop, a mobile device, a smart phone, a tablet device, or a server.

As persons skilled in the art of the present technology may appreciate, multiple variations as to how the computing environment 740 can be implemented may be envisioned without departing from the scope of the present technology.

Referring back to FIG. 6, the computer system 610 has at least one interface device 620 for providing an input or an output to a user of the system 600, the interface device 620 being in communication with the input/output interface 780. In the embodiment of FIG. 6, the interface device is a screen 622. In other non-limiting embodiments of the present technology, the interface device 620 may be a monitor, a speaker, a printer or any other device for providing an output in any form such as an image form, a written form, a printed form, a verbal form, a 3D model form, or the like.

In the depicted embodiments of FIG. 6, the interface device 620 also comprises a keyboard 624 and a mouse 626 for receiving input from the user of the system 600. Other interface devices 620 for providing an input to the computer system 610 can include, without limitation, a USB port, a microphone, a camera or the like.

The computer system 610 may be connected to other users, such as through their respective clinics, through a server (not depicted). The computer system 610 may also be connected to stock management or client software which could be updated with stock when the orthodontic treatment has been determined and/or schedule appointments or follow-ups with clients, for example.

Manufacturing

The system 600 could, in some embodiments, further include a manufacturing system 640 (shown schematically in FIG. 6) for making the aligner 10, operatively communicable with the computer system 610. While described as being generally co-located with other portions of the system 600, it is also contemplated that the manufacturing system 640 could be disposed at a separate location and be communicatively connected to remaining portions of the system 600 as described above, such as by an internet connection. In some such implementations, the computer system 610 could send manufacturing instructions to the manufacturing system 640, for example. Details relating to the manufacturing system and processes implemented therewith will be described briefly herein. Further information can be found in U.S. Pat. No. 10,717,208, entitled "Methods and Systems for Thermoforming Orthodontic Aligners", issued on Jul. 21, 2020, the entirety of which is incorporated herein by reference.

Figure 8:
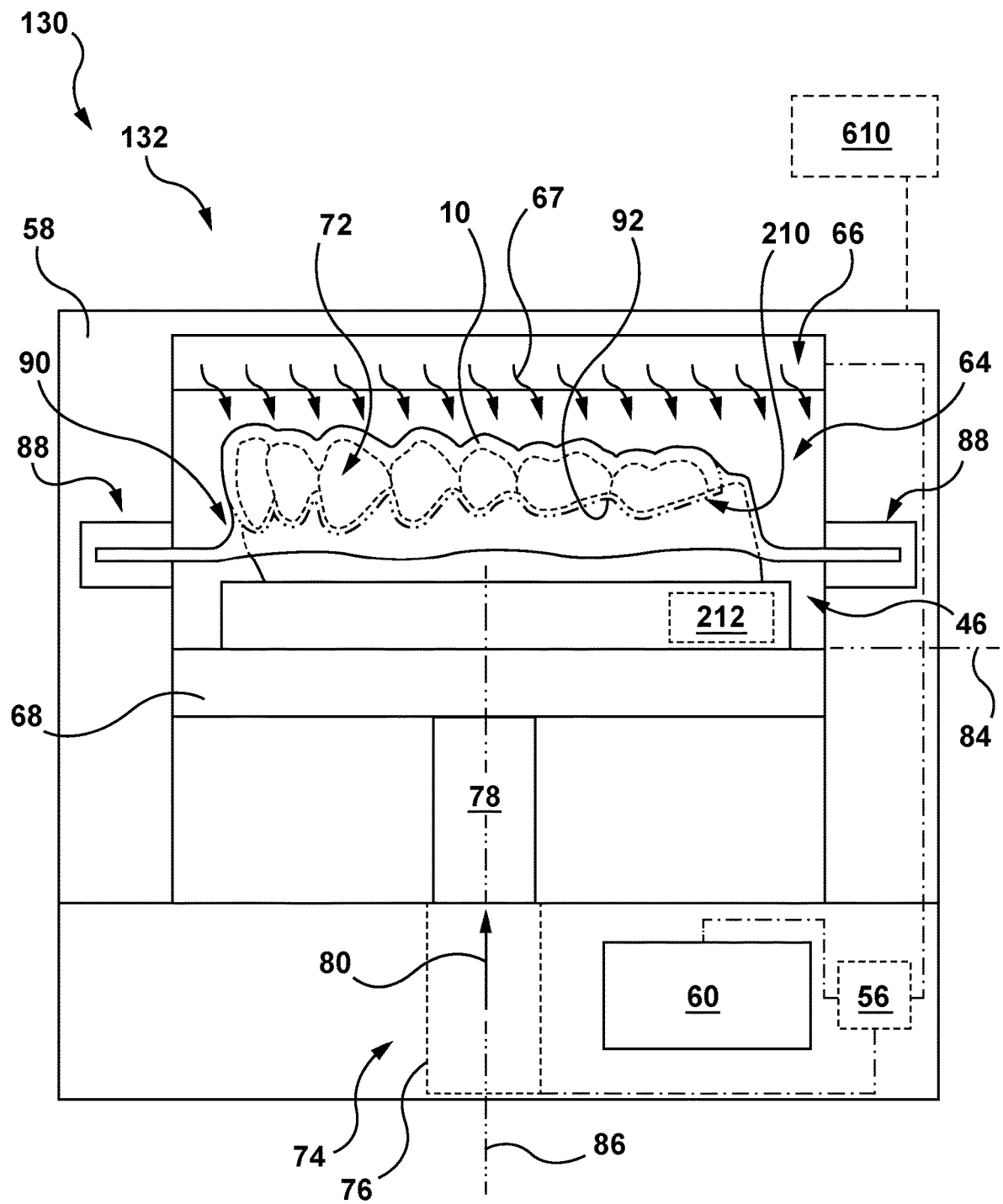
FIG. 8 depicts a schematic diagram of a thermoforming device, an aligner mold and an orthodontic appliance being formed in the thermoforming device, according to certain embodiments of the present technology.

Referring to FIGS. 6 and 8, in certain embodiments, the manufacturing system 640 includes a thermoforming device 132 for shaping a precursor aligner into the aligner 10 using an aligner mold 46, by a process which will be described generally hereinbelow.

In some embodiments, the manufacturing system 640 further includes a computer-assisted post-processing device 134 (shown schematically), such as a computer numerical control (CNC) milling device or a CNC laser cutting device for further shaping the aligner 10 into a post-processed aligner (not shown). The post-processing of the aligner 10 may include one or both of (i) forming recesses or openings in the aligner body 14, and (ii) forming an edge of the channel 18. In some such embodiments, the post-processing device 134 is operatively connectable to the computer system 510 for receiving operating instructions from the computer system 610 for post-processing the aligner 10. The operating instructions may for example be derived from a digital model indicative of a desired aligner (not shown).

In some embodiments, the manufacturing system 640 further includes an auxiliary manufacturing device 136 (shown schematically) for making the aligner mold 46. The auxiliary manufacturing device 136 is an additive manufacturing device, also referred to in some cases as a 3D printing device. It is also contemplated that, in other embodiments, a CNC milling device may be used instead. In certain embodiments, an auxiliary manufacturing device may be used for making precursor aligners, for example an additive manufacturing device arranged for fabricating customized precursor aligners.

In some embodiments, the computer system 610 is configured to receive image data from the imaging device 630 pertaining to the subject or to a given orthodontic treatment (such as a digital model of the aligner 10), as is described above. The computer system 610 may use the image data for determining the thermoforming parameters. In certain embodiments, the computer system 610 is arranged to determine an orthodontic treatment using the image data.

In certain non-limiting embodiments, the system 600 further includes a robotic system 138 (shown schematically) arranged relative to the thermoforming device 132, for handling one or more of the aligner mold 46, the precursor aligner, and the aligner 10. In some non-limiting embodiments, the robotic system could be omitted.

In certain non-limiting embodiments, the system 600 further includes a mold manufacturing system 140 communicatively coupleable to the computer system 610 for making the aligner mold 46. The mold manufacturing system 140 may include an additive manufacturing (3D printing) apparatus.

In certain embodiments, the system 600 and/or computer system 610 could be connectable to one or more of the imaging device 630, the thermoforming device 132, the post-processing device 134, the auxiliary manufacturing device 136, the robotic system 138 (where included), and the mold manufacturing system 140 via a communication network. In some embodiments, the communication network is the Internet and/or an Intranet. Multiple embodiments of the communication network may be envisioned and would be apparent to the person skilled in the art of the present technology.

With reference to FIG. 8, the thermoforming device 132 is schematically represented according to certain embodiments of the present technology. The thermoforming device 132 is arranged to receive the aligner mold 46 and the precursor aligner, and to shape the precursor aligner onto the aligner mold 46 during a thermoforming operation, in which heat and pressure imparted to the precursor aligner during shaping are controlled.

The thermoforming device 132 has a device body 58 housing a control unit 56. The control unit 56 is arranged to receive a signal indicative of operating instructions from the computer system 610. The control unit 56 can also be arranged to receive a signal indicative of operating instructions from a user interface 60 connected to the device body 58. Based on the signal, the control unit 56 selectively causes the thermoforming device 132 to operate according to one or more given operating parameters (e.g., thermoforming temperature, thermoforming pressure) values, as will be further described hereinbelow.

The device body 58 defines a chamber 64 having a platform 68 on which the aligner mold 46 may be supported. The chamber 64 is sized for receiving the aligner mold 46 and the precursor aligner.

The aligner mold 46 has a base portion and an anatomic portion. The base portion 70 comprises a code-bearing portion 212 bearing a code indicative of the aligner mold 46. It is contemplated that the code-bearing portion 212 could be disposed elsewhere on the aligner mold 46. The anatomic portion 72 is adjacent the base portion and includes a teeth portion representing teeth of the subject being disposed in a desired configuration as determined per the given orthodontic treatment plan. The anatomic portion also comprises a mucosa portion including a shape of the gingiva and gumline adjacent the teeth 22 of the subject. The mucosa portion may also include a shape of vestibular tissue and/or oral cavity-lining tissue, although it does not have to be the case. The teeth and mucosa portions together are inclusive of a portion of the anatomic portion 72 of the aligner mold 46 representing a shaping portion 210 of the aligner mold 46 to be used for shaping the precursor aligner.

The thermoforming device 132 also includes a heating element 66 for generating heat 67 inside the chamber 64. Moreover, the heating element 66 is operable for selectively adjusting its heating temperature based on a desired thermoforming temperature value. The control unit 56 is electronically connected to the heating element 66 for selectively causing the heating temperature to be adjusted based on the desired thermoforming temperature value. In this embodiment, the thermoforming device 132 has a range of thermoforming temperature values between about 180 Celsius and 260 Celsius.

The platform 68 and the heating element 66 are configured relative to one another such that when the base portion 70 of the aligner mold 46 is disposed on the platform 68, the anatomic portion 72 of the aligner mold 46 faces the heating element 66. The thermoforming device 132 includes a pneumatic actuator 74 in fluid connection with a compressor (not shown). The pneumatic actuator has a fixed portion 76 connected to the body 58 and a movable portion 78 connected to the platform 68. The movable portion 78 is slidably connected to the fixed portion 76. The pneumatic actuator 74 is structured for converting energy in the form of pressure received from the compressor into a pushing force 80 for moving its movable portion 78 relative to its fixed portion 76. The pneumatic actuator 74 is controllable for selectively limiting the pressure imparted by the compressor based on a desired thermoforming pressure value so as to selectively move the movable portion 78. The control unit 56 is electronically connected to the pneumatic actuator 74 for selectively causing the movable portion 78 to be moved by the pushing force, the pushing force being commensurate to the selected desired thermoforming pressure value. In this embodiment, the desired thermoforming pressure value is selectable between 2 Bar and 10 Bar. The pneumatic actuator 74 is operatively connected to the platform 68, via the movable portion 78, for moving the platform 68 relative to the chamber 64 from a first platform position to a second platform position 84 along a thermoforming axis 86, the second platform position 84 being closer to the heating element 66. Also, it should be noted that the heating element 66 is configured relative to the chamber 64 so as to remain spaced from the platform 68 when the platform 68 is in either of the first 82 or the second platform positions 82, 84. In other embodiments, other types of actuators, such as hydraulic and electric actuators, are contemplated as alternatives to the pneumatic actuator 74.

The thermoforming device 132 also includes a securing mechanism 88 (not shown in detail) configured for retaining a position of the precursor aligner in the chamber 64, particularly during the thermoforming operation. In this case, the securing mechanism 88 is a clamp. In other embodiments, the securing mechanism 88 can be arranged to retain the precursor aligner in a different manner. The securing mechanism 88 is arranged relative to the heating element 66 such that when the precursor aligner is being retained by the securing mechanism 88, the precursor aligner can be exposed to heat radiating from the heating element 66 to cause a material temperature of the precursor aligner to increase to a temperature substantially equivalent to the desired thermoforming temperature.

In some embodiments, the securing mechanism 88 is configurable between an open configuration for removably receiving the precursor aligner and a closed configuration for retaining the precursor aligner. The control unit 56 is electronically connected to the securing mechanism 88 for selectively causing the securing mechanism 88 to be configured in the open configuration or in the closed configuration.

Method

Given the architecture and the examples provided hereinabove, it is possible to execute a method for generating a 3D digital model of the aligner 10 including the object 36, the 3D digital model 41 of the aligner mold 46 including mold portions for the object 36, and/or for manufacturing the aligner 10 or the aligner mold 46 based on the 3D digital model. In some embodiments, the present technology could additionally or alternatively serve for determining one or more orthodontic treatments, including for example, designing one or more orthodontic treatment appliances, such as the aligner 10.

Figure 9:
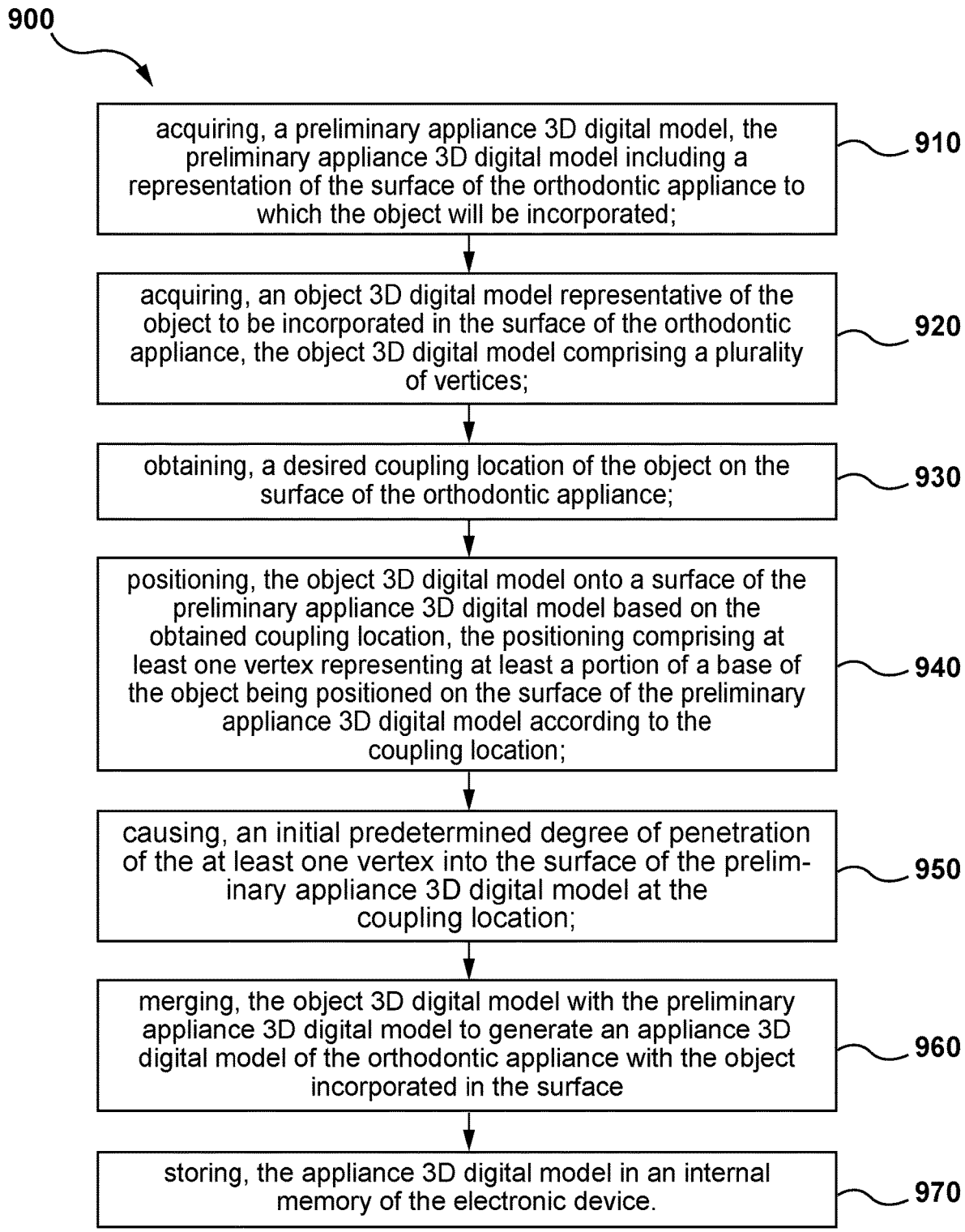
FIG. 9 depicts a flowchart of a method for manufacturing an orthodontic appliance including an object thereon, in accordance with certain embodiments of the present technology.

With reference to FIG. 9, there is depicted a flowchart of a method 900, according to certain non-limiting embodiments of the present technology. The method 900 is executed by an electronic device, such as the processor 750 of the computing environment 740. In some embodiments, the method 900 could be implemented by a different computer-implemented device.

The method 900 commences at step 910.

Step 910: Acquiring a Preliminary Appliance 3D Digital Model, the Preliminary Appliance 3D Digital Model Including a Representation of the Surface of the Orthodontic Appliance to which the Object Will be Incorporated.

The method 900 commences at step 910 with the processor 750 acquiring a 3D digital model of an orthodontic appliance (FIG. 10), hereinafter referred to as "preliminary appliance 3D digital model 1000". The preliminary appliance 3D digital model 1000 includes a representation of a surface of the orthodontic appliance. At this stage, the preliminary appliance 3D digital model 1000 does not include a representation of an object which is to be incorporated therein. The object may comprise the object 36 which may be an embossment and/or a protrusion. The object may comprise the first object 36*a*, the second object 36*b*, the third object 36*c* or the fourth object 36*d*, for example.

In certain embodiments, the orthodontic appliance may comprise an aligner, such as the aligner 10 having the inner surface 12 and the outer surface 14. The preliminary appliance 3D digital model 1000 is a representation of a surface of the aligner 10. The surface may comprise the inner surface 12, the outer surface 14 or both the inner and outer surfaces 12, 14. The inner surface 12 of the aligner 10 may substantially correspond to an outer surface of crown portions of the subject's teeth with certain variations which are configured to exert a desired force to a given tooth to move the given tooth to a desired position. Accordingly, the preliminary appliance 3D digital model 1000 may include a representation of a plurality of the subject's teeth including a 3D digital model of a given tooth associated with the subject.

Figure 10A:
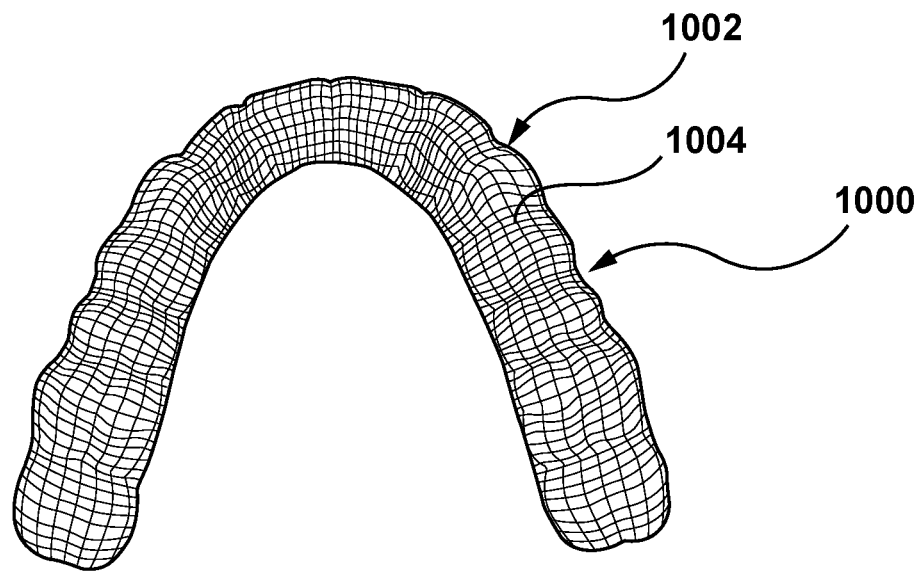
FIG. 10A depicts a preliminary appliance 3D digital model, according to certain embodiments of the present technology.
Figure 10B:
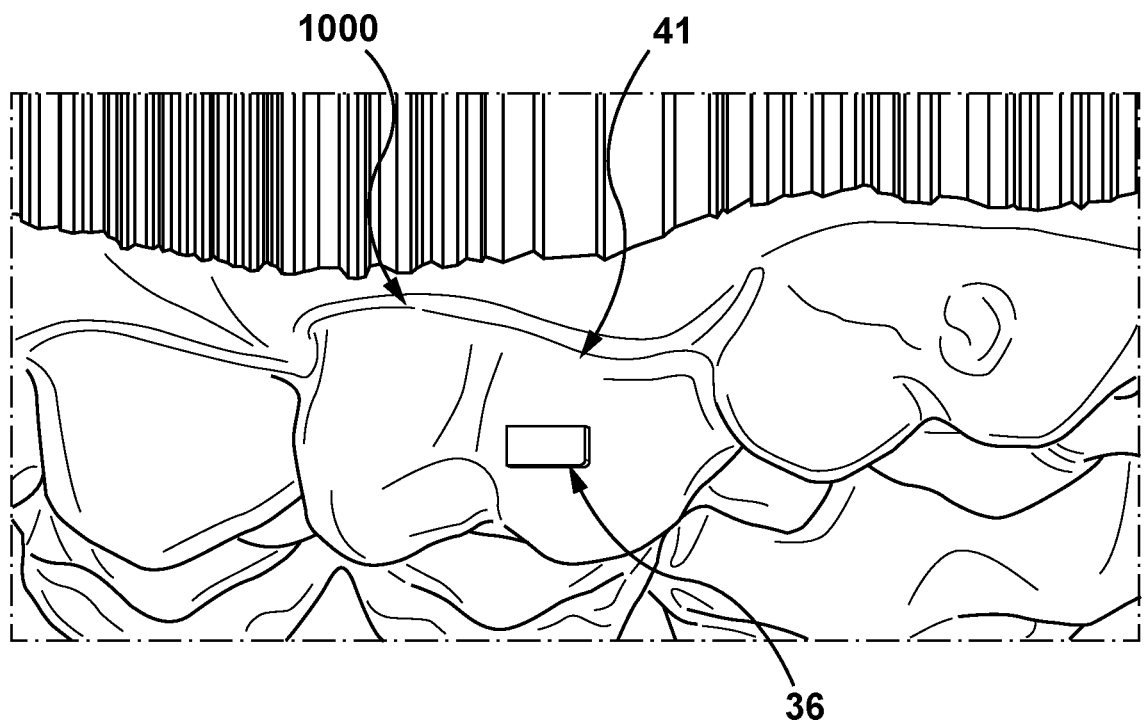
FIG. 10B depicts a zoomed-in view of the preliminary appliance when it is representative of an aligner mold and including an object which is a protrusion, according to certain embodiments of the present technology.
Figure 10C:
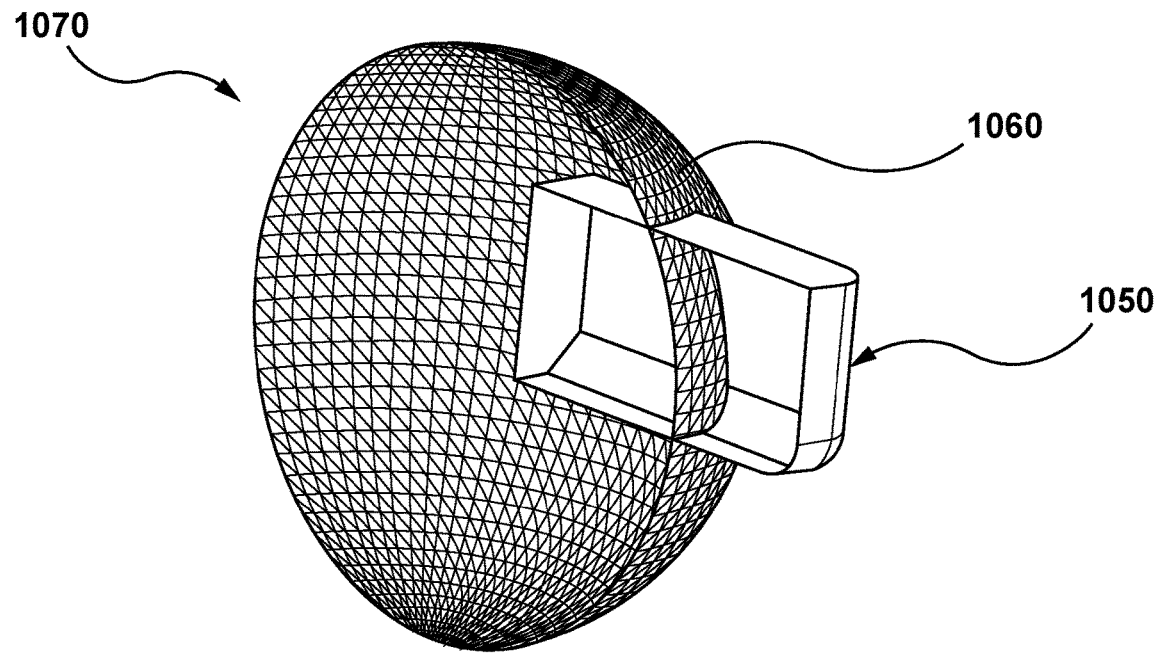
FIG. 10C depicts a 3D digital model of a tooth including an attachment, the aligner mold configured to make an aligner for receiving the tooth with a protrusion.

In certain embodiments, the orthodontic appliance may comprise an aligner mold, such as the aligner mold 46. The preliminary appliance 3D digital model 1000 may be the 3D digital model 41 of the aligner mold 46. When the object 36 on the aligner mold 46 is an embossment, it will create a protruding object on the aligner that is molded using the aligner mold 46. FIG. 10B depicts the preliminary appliance 3D digital model 1000 when it depicts the aligner mold 46 and including the object 36 as a protrusion (to produce the aligner with an embossment). The thus produced aligner embossment may be configured to receive an attachment 1050 on a tooth 1060, in use. Accordingly, the preliminary appliance 3D digital model 1000 may be based on a 3D digital model 1070 representing the tooth 1060 including the attachment 1050 which is a protrusion (FIG. 10C). When the object 36 on the aligner mold 46 is a protrusion, it will create an embossed object on the aligner that is molded using the aligner mold 46.

In certain embodiments, the preliminary appliance 3D digital model 1000 may have been retrieved by the processor 750 from a memory, such as the memory 770.

In certain embodiments, the preliminary appliance 3D digital model 1000 may have been generated by the processor 750 from image data of a physical model representing the inner surface 12 of the orthodontic appliance. In the case of the orthodontic appliance being the aligner 10, the physical model may be a mold for use in manufacturing the aligner 10 by thermoforming methods.

The preliminary appliance 3D digital model 1000 may have any appropriate format such as a mesh, a point cloud, etc. In certain embodiments, as shown in FIG. 10, the preliminary appliance 3D digital model 1000 comprises a plurality of mesh elements 1002 and vertices 1004. The plurality of mesh elements 1000 may include, without limitation, polygonal mesh elements such as triangular mesh elements or quadrilateral mesh elements. The polygonal mesh elements may be concave, convex or linear.

Step 920: Acquiring an Object 3D Digital Model Representative of the Object to be Incorporated in the Surface of the Orthodontic Appliance, the Object 3D Digital Model Comprising a Plurality of Vertices.

Figure 11:
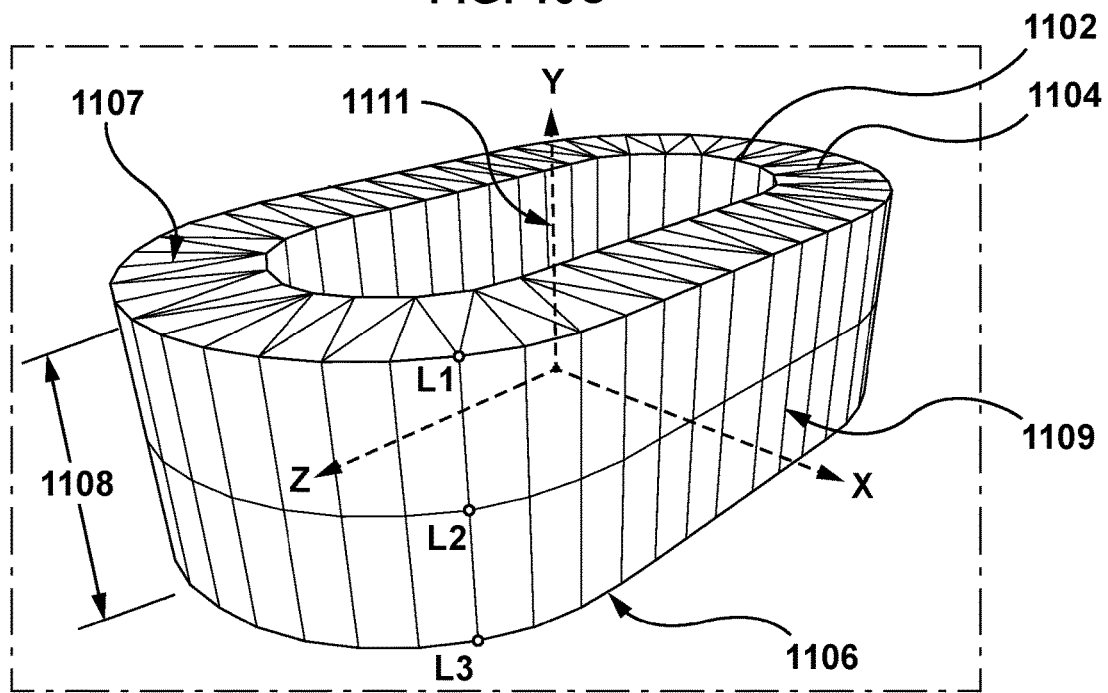
FIG. 11 depicts an object 3D digital model, according to certain embodiments of the present technology.

At step 920, the processor 750 acquires a 3D digital model of the object to be incorporated in the surface of the orthodontic appliance, hereinafter referred to as "object 3D digital model 1100" (FIG. 11). The object may be the object 36, such as the first object 36*a*, the second object 36*b*, the third object 36*c* or the fourth object 36*d*.

As noted above, the object 36 has a three-dimensional configuration and is intended to be formed as an embossment or a protrusion in the inner surface 12 or the outer surface 14 of the aligner 10, or as an embossment or a protrusion in an outer surface of a mold, such as the aligner mold 46.

Referring to FIG. 11, as an example, the object 3D digital model 1100 is of an object 36 which is a number zero (0). In other embodiments, the object 3D digital model 1100 may be of a 3D digital model of an object 36 of any configuration such as any number, letter, mark, shape, pattern, or combinations of the same.

The object 3D digital model 1100 comprises a plurality of mesh elements 1102 and vertices 1104. The plurality of mesh elements 1102 may include, without limitation, mesh elements 1102 with a polygonal configuration, such as triangular or quadrilateral.

The object 3D digital model 1100 has a base 1106, a top 1107 and a side 1109.

The object 3D digital model 1100, as illustrated in FIG. 11, comprises a plurality of layers, L1, L2 and L3, of the mesh elements 1102 and the vertices 1104. The mesh elements 1102 and the vertices 1104 of each layer are co-planar. The mesh elements 1102 and the vertices 1104 of the layer L3 define the base 1106 of the object 36. The mesh elements 1102 and the vertices 1104 of the layer L1 define the base 1106 of the object 36. The layers L1, L2 and L3 define a height 1108 of the object 36. In other embodiments, there may be more or fewer than the three layers L1, L2 and L3 shown in FIG. 11. In a non-layered object 3D digital model 1100, a lowermost set of mesh elements 1102 and vertices 1104 define the base 1106. The layered structure of the object 3D digital model 1100 may assist with attaching structures thereto. The number of layers and dimensions of the layers can be selected based on a desired granularity level.

The object 3D digital model 1100 may include an object coordinate system 1109.

In certain embodiments in which the object 36 is an embossment, the base 1106 of the object 3D digital model 1100 will define a base of the embossment, in a manner that will be described below in relation to Step 950. The embossment on the orthodontic appliance surface may have a depth equivalent to or less than the height 1108 of the object 3D digital model 1100.

In other embodiments in which the object 36 is a protrusion, the top 1107 will define a top surface of the protrusion, in a manner that will be described with reference to Step 950. A height of the eventual protrusion from the orthodontic appliance surface may be equivalent to or less than the height 1108.

In certain embodiments, the object 3D digital model 1100 may have been retrieved by the processor 750 from a memory, such as the memory 770.

In certain embodiments, the object 3D digital model 1100 may have been generated by the processor 750 from image data of a physical model representing the object 36.

Step 910 and Step 920 may be performed in any sequence.

Figure 12:
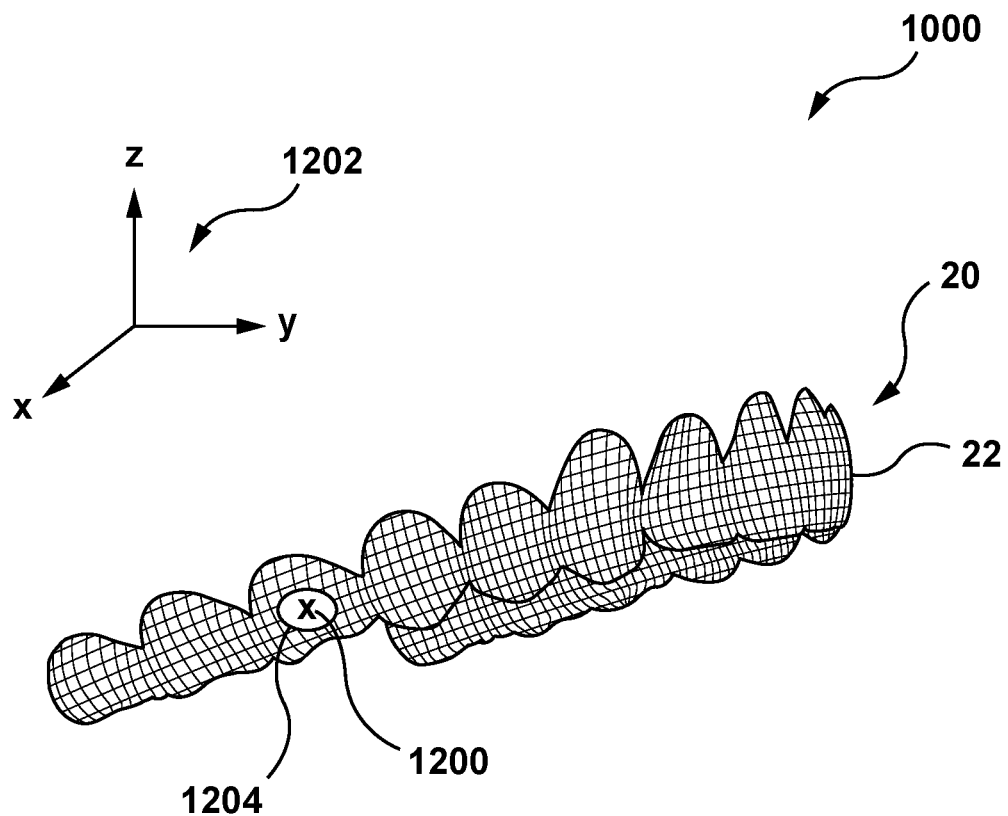
FIG. 12 depicts the preliminary appliance 3D digital model of FIG. 10 and including a coupling location for the object 3D digital model, according to certain embodiments of the present technology.

Step 930: Obtaining a Desired Coupling Location of the Object on the Surface of the Orthodontic Appliance At step 930, the method 900 comprises the processor 750 obtaining a desired coupling location 1200 (FIG. 12) of the object, such as the object 36 on the surface of the aligner 10.

In this respect, the preliminary appliance 3D digital model 1000 may include a coordinate system 1202. The coupling location 1200 may be an x, y, z coordinate defined by the coordinate system 1202. In one non-limiting example, the processor 750 may be configured to determine the coordinate system 1202 such that an XY plane thereof is parallel to an average tooth axis.

In certain embodiments, the coupling location 1200 may be part of a permissible coupling area 1204. The coupling area 1204 may define a 2D area on the surface of the preliminary appliance 3D digital model 1000 within which the object 36 is to be positioned. The coupling location 1200, on the other hand, may be a point on the surface of the preliminary appliance 3D digital model 1000 with which a given point of the object 36 should be positioned. The given point of the object 36 may be a given vertex 1004 of the base 1106 of the object 3D digital model 1100.

In certain embodiments, the coupling location 1200 and/or the coupling area 1204 may have been retrieved by the processor 750 from a memory, such as the memory 770.

In certain embodiments, the coupling location 1200 and/or the coupling area 1204 may have been generated by the processor 750 from image data of a physical model representing the coupling location 1200 and/or the coupling area 1204.

In certain embodiments, the method 900 comprises determining the coupling location 1200. The determining the coupling location 1200 may comprise the processor 750 obtaining at least one excluded area for the object 36 on the surface of the aligner 10, and determining the coupling location 1200 as being on a portion of the aligner 10 which is not within the at least one excluded area. For example, the at least one excluded area may coincide with a location of an attachment on a given tooth of the subject. The attachment location may be determined according to avoiding excluded areas on the teeth of the subject, such as one or more of: (i) a first excluded area, within which if the attachment were to be coupled to the tooth, there would be contact between the attachment and one or more teeth of an opposite arch form; (ii) a second excluded area, within which if the attachment were to be coupled to the tooth, there would be contact between the attachment and one or more neighbouring teeth of the same arch form; (iii) a third excluded area on a lingual surface of the tooth; (iv) a fourth excluded area on a buccal surface of the tooth; (v) a fifth excluded area which is within a predetermined distance of a gum line of the tooth; (vi) a sixth excluded area which is within a predetermined distance of an edge of an appliance to be worn over the arch form; (vii) a seventh excluded area based on a desired 90° angle between a normal axis of a vector on the digital 3D representation of the tooth and a tooth axis of the tooth. The coupling location determination may thus include at least portions of the method described in U.S. Ser. No. 17/143, 080 entitled "Orthodontic attachment systems and methods" filed Jan. 6, 2021, the content of which is hereby incorporated in its entirety.

In certain embodiments, the coupling area 1204 may have been determined according to a predetermined rule such as defining a border of the coupling area 1204 as being within a predefined radius of the coupling location 1200. The predefined radius may be the same or different for different locations on the surface of the preliminary appliance 3D digital model 1000.

The processor 750 may be configured to display the preliminary appliance 3D digital model 1000. The processor 750 may be configured to display an indicator of the coupling location 1200 and/or the coupling area 1204 on the preliminary appliance 3D digital model 1000. The indicator of the coupling location 1200 may be any suitable mark such as a cross, an arrow, a dot, or the like. The indicator of the coupling area 1204 may be any suitable mark such as a circle, a polygon, or the like.

In this respect, in certain embodiments, the method 900 comprises causing a display of the coupling location 1200 on the surface of the preliminary appliance 3D digital model 1000. In certain embodiments, the method 900 comprises causing a display of the coupling area 1204 on the surface of the preliminary appliance 3D digital model 1000.

In certain embodiments, the processor 750 may be configured to allow the movement of the coupling location 1200 on the surface of the preliminary appliance 3D digital model 1000. In embodiments in which the coupling area 1204 is present, the processor 750 may be configured to permit the movement of the coupling location 1200 within the coupling area 1204. In certain embodiments, the processor 750 may be configured to restrict the movement of the coupling location 1200 outside of the coupling area 1204.

Step 920 and step 930 may be performed in any order.

Figure 13:
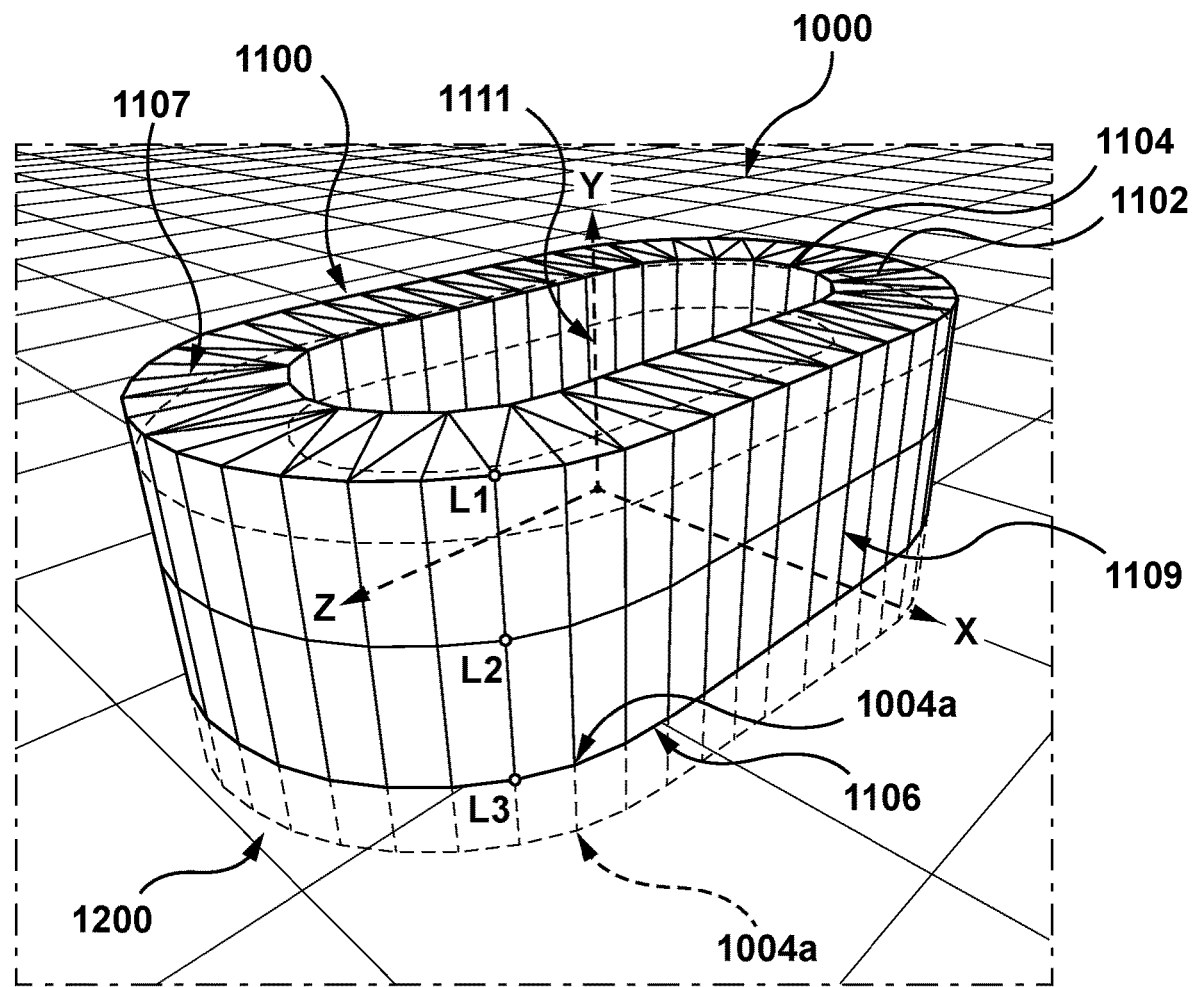
FIG. 13 depicts the preliminary appliance 3D digital model of FIG. 10 and including the object 3D digital model, according to certain embodiments of the present technology.

Step 940: Positioning the Object 3D Digital Model onto a Surface of the Preliminary Appliance 3D Digital Model Based on the Obtained Coupling Location, the Positioning Comprising at Least One Vertex Representing at Least a Portion of a Base of the Object being Positioned on the Surface of the Preliminary Appliance 3D Digital Model At step 940, the method 900 comprises the processor 750 positioning the object 3D digital model 1100 onto the preliminary appliance 3D digital model 1000 according to the obtained coupling location 1200 (FIG. 13). The positioning comprises moving the object 3D digital model 1100 so that at least one vertex 1004a at the base 1106 of the object 3D digital model 1100 is positioned on the surface of the preliminary appliance 3D digital model 1000 at the coupling location 1200. The at least one vertex 1004a may be at a predetermined location on the base of 1106 of the object 36 such as a median point, a mid point along a length of the base 1106, etc. The coupling location 1200 may also include information about the orientation of the object 3D digital model 1100 according to the coordinate system 1202 so that the at least one vertex 1004a is positioned on the surface of the preliminary appliance 3D digital model 1000 at a certain predetermined orientation.

It will be appreciated that positioning the at least one vertex 1004a on the surface of the preliminary appliance 3D digital model 1000 may also cause one or more other vertices of the base 1106 to be positioned on the surface of the preliminary appliance 3D digital model 1000.

The processor 750 may be configured to display the object 3D digital model 1100 positioned on the surface of the preliminary appliance 3D digital model 1000. In certain embodiments, the method 900 comprises causing a display of the coupling area 1204 on the surface of the preliminary appliance 3D digital model 1000, as well as the object 3D digital model 1100.

In certain embodiments, the processor 750 may be configured to allow the movement of the object 3D digital model 1100 on the surface of the preliminary appliance 3D digital model 1000. In embodiments in which the coupling area 1204 is present, the processor 750 may be configured to permit the movement of the object 3D digital model 1100 within the coupling area 1204. In certain embodiments, the processor 750 may be configured to restrict the movement of the object 3D digital model 1100 outside of the coupling area 1204.

The method 900 then continues to Step 950.

Step 950: Causing an Initial Predetermined Degree of Penetration of the at Least One Vertex into the Surface of the Preliminary Appliance 3D Digital Model at the Coupling Location In Step 950, the processor 750 causes the object 3D digital model 1100 to move relative to the preliminary appliance 3D digital model 1000 so that the at least one vertex 1004a of the object 3D digital model 1100 penetrates the surface of the preliminary appliance 3D digital model 1000 by an initial predetermined degree of penetration.

In certain embodiments, the initial predetermined degree of penetration comprises one of the layers of the object 3D digital model 1100. This is illustrated in FIG. 13 in dotted lines. One layer of the object 3D digital model 1100 may comprise any suitable dimension, which may be predetermined. In other embodiments, the predetermined degree of penetration may be more that one layer of the object 3D digital model 1100, or be defined by a predetermined distance. The predetermined degree of penetration is at least 0.2 mm in certain embodiments.

In certain embodiments, this will cause all the vertices 1004 defining the base 1106 of the object 3D digital model 1100 to penetrate the surface of the preliminary appliance 3D digital model 1000.

However, in certain other embodiments, not all of the vertices 1004 defining the base 1106 of the object 3D digital model 1100 may be planar with each other and/or with the surface of the preliminary orthodontic appliance 3D digital model. This may result in some of the vertices 1004 remaining outside of the surface of the preliminary appliance 3D digital model 1000.

Step 960: Merging the Object 3D Digital Model with the Preliminary Appliance 3D Digital Model to Generate an Appliance 3D Digital Model of the Orthodontic Appliance with the Object Incorporated in the Surface In cases in which some of the vertices 1004 remain outside of the surface of the preliminary appliance 3D digital model 1000 after the initial predetermined degree of penetration of step 950, the method 900 may further comprise Step 960 in which the object 3D digital model is merged with the preliminary appliance 3D digital model to generate the appliance 3D digital model of the orthodontic appliance with the object incorporated in the surface.

The merging comprises iteratively modifying, by the processor 750, based on a predetermined step, the initial predetermined degree of penetration of the object 3D digital model 1100 into the preliminary appliance 3D digital model 1000.

In certain embodiments, the iteratively modifying is performed until a target predetermined degree of penetration of the object is attained. The target predetermined degree of penetration may include a maximum threshold or a minimum threshold height of the object 36 as a protrusion from the surface of the orthodontic appliance.

In certain embodiments, the iteratively modifying is performed until a modified degree of penetration is obtained in which all the vertices 1004 defining the base 1106 of the object 3D digital model 1100 have penetrated the surface of the preliminary appliance 3D digital model 1000. The modified degree of penetration may define the height of the object 36 as a protrusion from the surface of the orthodontic appliance.

In certain embodiments, in which the object 36 is an embossment in the surface of the orthodontic appliance, the method may further comprise extruding the object 3D digital model 1100 into the preliminary appliance 3D digital model 1000 whilst retaining the base of the object 3D digital object at the modified degree of penetration or the target degree of penetration. The top 1107 then extends furthest under the surface of the preliminary appliance 3D digital model 1000 and defines a base of the embossment. The height 1108 less the modified degree of penetration would then define the depth of the embossment.

In certain embodiments, the method 900 further comprises determining a depth of the object 3D digital model under the surface of the preliminary appliance 3D digital model, and if the determined depth is different to a target depth, modulating the depth to attain the target depth.

In certain embodiments, the method 900 further comprises determining a depth of the object 3D digital model under the surface of the preliminary appliance 3D digital model, and if the determined depth is above or below a threshold depth, incrementally modulating the depth.

In certain embodiments, the method 900 further comprises determining a height of the object 3D digital model above the surface of the preliminary appliance 3D digital model, and if the determined height is different to a target height, modulating the height to attain the target height.

In certain embodiments, the method 900 further comprises determining a height of the object 3D digital model above the surface of the preliminary appliance 3D digital model, and if the determined height is above or below a threshold depth, incrementally modulating the height.

For example, when the object 36 is an embossment in the aligner 10, the processor 750 may determine a height of the object 3D digital model 1100 protruding from the surface of the preliminary appliance 3D digital model 1000. If the height is lower than the minimum height threshold (i.e. the eventual embossment would be too shallow to fulfil its function, such as be visible), causing by the processor, reversing the penetration until the minimum height threshold is met. There may also be provided a maximum height threshold, which may be linked to a maximum embossment depth that does not compromise the structural integrity of the aligner 10.

In another example, when the object 36 is a protrusion on the aligner mold 46, the processor 750 may apply a minimum height threshold, i.e. if the height is lower than the minimum height threshold, the eventual embossment would be too shallow to fulfil its function, such as be visible). Alternatively or additionally, the processor 750 may also apply a maximum height threshold, i.e. if the height is higher than the maximum height threshold, the eventual embossment depth may be too deep and compromise the structural integrity of the eventual aligner 10.

In yet another example, when the object 36 is a protrusion on the aligner 10, the processor may apply a minimum height threshold, i.e. if the height is lower than the minimum height threshold, the protrusion would not fulfil its function, such as engaging with a tooth in use). Alternatively or additionally, the processor 750 may also apply a maximum height threshold, i.e. if the height is higher than the maximum height threshold, the protrusion may not fulfil its intended function or cause harm such as through collisions.

Step 970: Storing, by the Processor, the Appliance 3D Digital Model in an Internal Memory of the Electronic Device.

In some embodiments, the method 900 could further include determining an orthodontic treatment for the subject based at least in part on the determined 3D digital model of the aligner 10.

In some embodiments, the method 900 could further include manufacturing one or more orthodontic treatment appliances for the subject, such as the aligner 10. In at least some implementations, manufacturing one or more orthodontic treatment appliances for the subject could include sending, by the electronic device or the processor 750, instructions to the manufacturing system 130 to cause the appliances to be manufactured. For example, one or more aligners 10 could be manufactured using the manufacturing system 130, where a design of the orthodontic treatment appliance produced is based at least in part on the appliance 3D digital model including the object 36.

In some implementations, the method 900 further includes causing displaying, on an interactive display system operatively connected to the electronic device, the determined appliance 3D digital model including the object. In some such cases, the determined appliance 3D digital model including the object could be configured to be manipulated by the user or operator of the interactive display system 620.

The method 900 has thus completed manufacturing of the orthodontic appliance. As is described briefly above, an orthodontic treatment plan could include design or selection of one or more of the manufactured orthodontic appliances. In other implementations, additional or alternative treatment appliances or methods could be used in different orthodontic treatment plans.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of manufacturing an orthodontic appliance with an object incorporated in a surface thereof, the method executable by a processor of an electronic device, the method comprising:

acquiring, by the processor, a preliminary appliance 3D digital model, the preliminary appliance 3D digital model including a representation of the surface of the orthodontic appliance to which the object will be incorporated;

acquiring, by the processor, an object 3D digital model representative of the object to be incorporated in the surface of the orthodontic appliance, the object 3D digital model comprising a plurality of vertices;

obtaining, by the processor, a desired coupling location of the object on the surface of the orthodontic appliance;

positioning, by the processor, the object 3D digital model onto a surface of the preliminary appliance 3D digital model based on the obtained coupling location, the positioning comprising at least one vertex representing at least a portion of a base of the object being positioned on the surface of the preliminary appliance 3D digital model according to the coupling location;

causing, by the processor, an initial predetermined degree of penetration of the at least one vertex into the surface of the preliminary appliance 3D digital model at the coupling location;

merging, by the processor, the object 3D digital model with the preliminary appliance 3D digital model to generate an appliance 3D digital model of the orthodontic appliance with the object incorporated in the surface, the merging including:

iteratively modifying, if each vertex of the plurality of vertices of the base of the object 3D digital model are not within the surface of the preliminary appliance 3D digital model, the initial predetermined degree of penetration of the object 3D digital model into the preliminary appliance 3D digital model based on a predetermined step until:

each vertex of the plurality of vertices of the base of the object 3D digital model has penetrated the surface of the preliminary appliance 3D digital model; and storing, by the processor, the appliance 3D digital model in an internal memory of the electronic device.

2. The method of claim 1, wherein the iteratively modifying is performed until a target predetermined degree of penetration of the object is attained.

3. The method of claim 1, further comprising, prior to the storing, extruding the object 3D digital model into the surface of the preliminary object 3D digital model whilst retaining the base of the object 3D digital object at the initial predetermined degree of penetration or the modified degree of penetration.

4. The method of claim 3, further comprising determining a depth of the object 3D digital model under the surface of the preliminary appliance 3D digital model, and if the determined depth is different to a target depth, modulating the depth to attain the target depth.

5. The method of claim 3, further comprising, determining a depth of the object 3D digital model under the surface of the preliminary appliance 3D digital model, and if the determined depth is above or below a threshold depth, incrementally modulating the depth.

6. The method of claim 3, wherein the object is an embossment in a surface of the orthodontic appliance.

7. The method of claim 6, wherein the orthodontic appliance is an orthodontic aligner or an aligner mold.

8. The method of claim 3, wherein the orthodontic appliance is an aligner and the object is an indent on an inner surface of the aligner, the indent configured to receive an attachment coupled to a tooth of the subject when the aligner is worn by the subject over the tooth.

9. The method of claim 1, further comprising determining a height of the object 3D digital model above the surface of the preliminary appliance 3D digital model, and if the determined height is different to a target height, modulating the height to attain the target height.

10. The method of claim 1, further comprising, determining a height of the object 3D digital model above the surface of the preliminary appliance 3D digital model, and if the determined height is above or below a threshold depth, incrementally modulating the height.

11. The method of claim 1, wherein the object is a marker indicative of one or both of: (i) a treatment step associated with the orthodontic appliance, and (ii) an identity of a subject associated with the orthodontic appliance.

12. The method of claim 1, wherein the object is a protrusion from the surface of the orthodontic appliance.

13. The method of claim 12, wherein the orthodontic appliance is an orthodontic aligner or an aligner mold.

14. The method of claim 1, wherein the obtaining the coupling location comprises determining the coupling location, the determining the coupling location comprising: obtaining at least one excluded area for the object on the orthodontic appliance; and determining the coupling location as being on a portion of the orthodontic appliance which is not within the at least one excluded area.

15. The method of claim 1, wherein the object 3D digital model is movable along the surface of the preliminary appliance 3D digital model within a coupling area which includes the coupling location, and the method further comprising restricting any movement of the object 3D digital model beyond the coupling area.

16. The method of claim 15, wherein the coupling area is defined on a portion of the preliminary appliance 3D digital model corresponding to a buccal surface of a given one of subject's teeth when the orthodontic appliance is worn over the teeth.

17. The method of claim 1, further comprising causing, by the processor, the manufacturing of the orthodontic appliance including the object thereon based on the determined appliance 3D digital model.

18. The method of claim 17, wherein the manufacturing comprises a thermoforming process.

19. The method of claim 1, further comprising determining an appliance mold 3D digital model based on the determined appliance 3D digital model.

20. A system of manufacturing an orthodontic appliance with an object incorporated in a surface thereof, the system comprising an electronic device having a processor, the processor configured to execute a method comprising: Page 6 of 16 acquiring a preliminary appliance 3D digital model, the preliminary appliance 3D digital model including a representation of the surface of the orthodontic appliance to which the object will be incorporated; acquiring an object 3D digital model representative of the object to be incorporated in the surface of the orthodontic appliance, the object 3D digital model comprising a plurality of vertices; obtaining a desired coupling location of the object on the surface of the orthodontic appliance; positioning the object 3D digital model onto a surface of the preliminary appliance 3D digital model based on the obtained coupling location, the positioning comprising at least one vertex representing at least a portion of a base of the object being positioned on the surface of the preliminary appliance 3D digital model according to the coupling location; causing an initial predetermined degree of penetration of the at least one vertex into the surface of the preliminary appliance 3D digital model at the coupling location; merging the object 3D digital model with the preliminary appliance 3D digital model to generate an appliance 3D digital model of the orthodontic appliance with the object incorporated in the surface, the merging including: iteratively modifying, if each vertex of the plurality of vertices of the base of the object 3D digital model are not within the surface of the preliminary appliance 3D digital model, the initial predetermined degree of penetration of the object 3D digital model into the preliminary appliance 3D digital model based on a predetermined step until: each vertex of the plurality of vertices of the base of the object 3D digital model has penetrated the surface of the preliminary appliance 3D digital model; and storing the appliance 3D digital model in an internal memory of the electronic device.

21. The system of claim 20, further comprising a manufacturing system for manufacturing the appliance from the determined appliance 3D digital model.

* * * * *